United States Patent
Araki et al.

(10) Patent No.: US 9,151,612 B2
(45) Date of Patent: Oct. 6, 2015

(54) VIBRATING GYROSCOPE INCLUDING PIEZOELECTRIC FILM SANDWICHED BETWEEN METALLIC FILM LAYERS

(75) Inventors: Ryuta Araki, Takarazuka (JP); Takashi Ikeda, Kaizuka (JP); Hiroshi Nishida, Takaishi (JP); Takafumi Moriguchi, Nishinomiya (JP); Yasuyuki Hirata, Kobe (JP)

(73) Assignee: SUMITOMO PRECISION PRODUCTS Co., Ltd., Amagasaki-shi (JP)

( * ) Notice: Subject to any disclaimer, the term of this patent is extended or adjusted under 35 U.S.C. 154(b) by 966 days.

(21) Appl. No.: 13/147,280

(22) PCT Filed: Jan. 6, 2010

(86) PCT No.: PCT/JP2010/050063
§ 371 (c)(1),
(2), (4) Date: Aug. 1, 2011

(87) PCT Pub. No.: WO2010/092842
PCT Pub. Date: Aug. 19, 2010

(65) Prior Publication Data
US 2011/0308315 A1     Dec. 22, 2011

(30) Foreign Application Priority Data
Feb. 11, 2009 (JP) ................ 2009-029188
Jul. 27, 2009 (JP) ................ 2009-173977

(51) Int. Cl.
G01C 19/56     (2012.01)
G01C 19/5677     (2012.01)
H01L 41/08     (2006.01)

(52) U.S. Cl.
CPC ............. *G01C 19/5677* (2013.01); *H01L 41/08* (2013.01)

(58) Field of Classification Search
CPC ............................ G01C 19/5677; H01L 41/08
USPC ............... 73/503.3, 504.02, 504.08, 504.12, 73/504.18, 514.34
See application file for complete search history.

(56) References Cited

U.S. PATENT DOCUMENTS

| | | | | |
|---|---|---|---|---|
| 4,655,081 A | * | 4/1987 | Burdess | 73/504.13 |
| 5,226,321 A | * | 7/1993 | Varnham et al. | 73/514.02 |

(Continued)

FOREIGN PATENT DOCUMENTS

| | | |
|---|---|---|
| EP | 2 008 966 A2 | 12/2008 |
| JP | 08-068638 A | 3/1996 |

(Continued)

OTHER PUBLICATIONS

Tatsuya et al (English Translation of Japanese Patent Application Publication JP 08 068638).*

*Primary Examiner* — Laura Martin
*Assistant Examiner* — Samir M Shah
(74) *Attorney, Agent, or Firm* — Marvin A. Motsenbocker; Mots Law, PLLC

(57) ABSTRACT

A vibratory gyro which is provided with a ring-shaped vibrating body, leg portions flexibly supporting the ring-shaped vibrating body, a plurality of electrodes formed by having a piezoelectric film sandwiched between an upper-layer metallic film and a lower-layer metallic film in the thickness direction, and a fixed potential electrode. The plurality of electrodes include a bank of driving electrodes for exciting primary vibration, detection electrodes for detecting secondary vibration, and suppression electrodes for suppressing the secondary vibration on the basis of a voltage signal from the detection electrodes. The driving electrodes, the detection electrodes and the suppression electrodes are disposed in the region from an outer peripheral edge of the ring-shaped vibrating body to a vicinity of the outer peripheral edge and/or a region from an inner peripheral edge thereof to a vicinity of the inner peripheral edge.

15 Claims, 23 Drawing Sheets

(56) References Cited

U.S. PATENT DOCUMENTS

| | | | |
|---|---|---|---|
| 5,540,094 A * | 7/1996 | Varnham et al. | 73/504.13 |
| 5,616,864 A * | 4/1997 | Johnson et al. | 73/504.04 |
| 5,652,374 A * | 7/1997 | Chia et al. | 73/1.38 |
| 5,817,940 A * | 10/1998 | Kobayashi et al. | 73/504.12 |
| 5,932,804 A * | 8/1999 | Hopkin et al. | 73/504.13 |
| 6,151,964 A * | 11/2000 | Nakajima | 73/504.13 |
| 6,282,958 B1 * | 9/2001 | Fell et al. | 73/504.13 |
| 6,343,509 B1 * | 2/2002 | Fell et al. | 73/504.13 |
| 6,401,534 B1 * | 6/2002 | Fell et al. | 73/504.13 |
| 6,889,550 B2 * | 5/2005 | Beitia | 73/504.12 |
| 7,107,843 B2 * | 9/2006 | Ohuchi et al. | 73/504.16 |
| 7,360,423 B2 * | 4/2008 | Ayazi et al. | 73/504.12 |
| 8,375,792 B2 * | 2/2013 | Ikeda et al. | 73/504.13 |
| 8,381,590 B2 * | 2/2013 | Ikeda et al. | 73/504.13 |
| 8,601,872 B2 * | 12/2013 | Ikeda et al. | 73/504.12 |
| 8,756,994 B2 * | 6/2014 | Yoneda et al. | 73/504.12 |
| 2004/0095046 A1 * | 5/2004 | Ouchi et al. | 310/370 |
| 2004/0134278 A1 * | 7/2004 | Fell et al. | 73/504.04 |
| 2007/0220972 A1 * | 9/2007 | Araki et al. | 73/504.12 |
| 2008/0105052 A1 * | 5/2008 | Takahashi et al. | 73/504.16 |
| 2009/0001565 A1 * | 1/2009 | Takemoto et al. | 257/729 |
| 2010/0281976 A1 * | 11/2010 | Ikeda et al. | 73/504.12 |
| 2011/0023601 A1 * | 2/2011 | Ikeda et al. | 73/504.13 |
| 2012/0125100 A1 * | 5/2012 | Araki et al. | 73/504.12 |

FOREIGN PATENT DOCUMENTS

| | | |
|---|---|---|
| JP | 08-271258 A | 10/1996 |
| JP | 2000-009473 A | 1/2000 |
| JP | 2009-28891 A | 2/2009 |
| WO | 99/47890 A1 | 9/1999 |

* cited by examiner

W

VIBRATING GYROSCOPE INCLUDING PIEZOELECTRIC FILM SANDWICHED BETWEEN METALLIC FILM LAYERS

TECHNICAL FIELD

The present invention relates to a vibrating gyroscope including a piezoelectric film and a method for manufacturing the vibrating gyroscope.

BACKGROUND ART

In recent years, there have been intensely developed vibrating gyroscopes including a piezoelectric material, in other words, gyroscopes utilizing vibrations, or angular velocity sensors. Conventionally developed is a gyroscope that includes a vibrating body itself made of a piezoelectric material, as disclosed in Patent Document 1. There is also a gyroscope that includes a piezoelectric film formed on a vibrating body. For example, Patent Document 2 discloses a technique for, by using a PZT film as a piezoelectric material, exciting a primary vibration of a vibrating body as well as for detecting partial distortion of a gyroscope, which is caused by a coriolis force generated to the vibrating body when an angular velocity is applied to the vibrating body.

Reduction in size of a gyroscope itself is also an important issue because a wide variety of devices including gyroscopes have been quickly reduced in size. In order to realize reduction in size of a gyroscope, significant improvement is required to accuracy in processing each member of the gyroscope. Strongly desired in the industry should be not only simple reduction in size but also further improvement in performance of a gyroscope, namely, in accuracy of detecting an angular velocity. However, the configuration of the gyroscope disclosed in Patent Document 2 fails to satisfy the demands over the last few years for reduction in size and improvement in performance.

PRIOR ART DOCUMENTS

Patent Documents

Patent Document 1: Japanese Unexamined Patent Publication No. H08-271258
Patent Document 2: Japanese Unexamined Patent Publication No. 2000-9473

SUMMARY OF THE INVENTION

Problems to be Solved by the Invention

As described above, it is quite difficult to achieve reduction in size and high processing accuracy in a vibrating gyroscope including a piezoelectric film as well as to satisfy the demand for such improvement in performance as a gyroscope. A gyroscope of a small size generally has a problem that, upon application of an angular velocity to a vibrating body, weakened is a signal to be detected by a detection electrode of the gyroscope. Therefore, in such a small vibrating gyroscope, the difference is decreased between the signal to be essentially detected and a signal generated due to a sudden external impact (disturbance), which results in difficulty in improving detection accuracy as a gyroscope.

There are various types of external impacts that are received suddenly. For example, the vibrating body in a ring shape, which is disclosed in Patent Document 2 already referred to, receives an impact that causes seesaw-like motions, about a fixed post at the center of the ring serving as an axis thereof, in a direction perpendicular to a plane including the ring. This impact excites a vibration in what is called a rocking mode. There is another impact by which the entire periphery of the ring-shaped member of the vibrating body supported by the fixed post is simultaneously bent upward or downward from the plane including the ring. This impact excites a vibration in what is called a bounce mode. It is quite difficult to achieve a technique for detecting an accurate angular velocity even in cases where the vibrating gyroscope receives some of these impacts.

Solutions to the Problems

The present invention solves the above technical problems so as to significantly contribute to reduction in size and improvement in performance of a vibrating gyroscope including a piezoelectric film, in other words, a gyroscope utilizing a vibration, or an angular velocity sensor. The inventors initially worked on one of the above technical problems and adopted a vibrating gyroscope in a ring shape as a basic configuration, which is recognized as receiving a relatively small influence of a disturbance. The inventors then studied intensively to obtain a configuration for solving the respective technical problems by causing the piezoelectric film to excite a primary vibration as well as to detect a secondary vibration generated by a coriolis force. Found as a result is that unique disposition of respective types of electrodes is required in a vibrating gyroscope including a piezoelectric film in order to apply to the vibrating gyroscope a dry process, which will enable high processing accuracy. Moreover, the inventors found out that, by devising the processing of an electrical signal related to the secondary vibration generated upon application of an angular velocity to the vibrating gyroscope, an S/N ratio is remarkably increased in comparison to the conventional cases, with no deterioration in responsiveness. The present invention was created in view of such a philosophy. It is noted that, in the present application, an "annular or polygonal vibrating gyroscope" is sometimes simply referred to as a "ring-shaped vibrating gyroscope".

A vibrating gyroscope according to the present invention includes: a ring-shaped vibrating body having a uniform plane; a leg portion flexibly supporting the ring-shaped vibrating body; and a plurality of electrodes disposed on the plane of or above the ring-shaped vibrating body, and formed with at least one of an upper-layer metallic film, a lower-layer metallic film, and a piezoelectric film being sandwiched between the upper-layer metallic film and the lower-layer metallic film in a thickness direction thereof. When N is a natural number of 2 or more, the plurality of electrodes include: a group of driving electrodes for exciting a primary vibration of the ring-shaped vibrating body in a vibration mode of cos Nθ, the driving electrodes being disposed (360/N)° apart from each other in a circumferential direction; a detection electrode for detecting a secondary vibration generated upon application of an angular velocity to the ring-shaped vibrating body, the detection electrode being disposed (90/N)° apart clockwise and/or counterclockwise from one of the driving electrodes; and a suppression electrode for suppressing the secondary vibration in accordance with a voltage signal outputted from the detection electrode, the suppression electrode being disposed (90/N)° apart clockwise or counterclockwise from one of the driving electrodes or being disposed (180/N)° apart from the detection electrode. Further, the driving electrodes, the detection electrode, and the suppression electrode are disposed in a region from an outer peripheral edge of the ring-shaped vibrating body to a vicinity of the outer peripheral edge and/or a region from an inner peripheral edge thereof to a vicinity of the inner peripheral edge.

In this vibrating gyroscope, there are provided, in the specific region described above, on the plane of the ring-shaped vibrating body, the electrodes for applying a voltage to a piezoelectric element or obtaining a voltage signal generated due to deformation of the piezoelectric element. Therefore, the piezoelectric element functions as a single axis angular velocity sensor and is capable of exciting the primary vibration as well as detecting the secondary vibration. More specifically, this vibrating gyroscope is configured to excite the primary vibration in the plane identical with that including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrodes and the ring-shaped vibrating body with a high degree of accuracy in accordance with the dry process technique. Furthermore, because the piezoelectric element is disposed in the specific region described above, this vibrating gyroscope has a degree of flexibility so as to be applicable to the vibration mode of cos Nθ when N is a natural number of 2 or more. More specifically, because of the piezoelectric element disposed in the specific region, the vibrating gyroscope utilizing an in-plane vibration exerts driving performance, detectability, and suppressing performance. This vibrating gyroscope further includes the suppression electrode for suppressing the secondary vibration in accordance with a voltage signal outputted from the detection electrode for detecting the secondary vibration. Therefore, remarkably improved is a ratio of the intensity of an output signal to external noise, namely, an S/N ratio. Several examples of the vibration mode of cos Nθ are disclosed in Japanese Published Patent Publication No. 2005-529306, Japanese Patent Application No. 2007-209014 that was filed by the applicant of the present application, and the like. In the present application, the term "flexible" is used to mean "so as to allow the vibrating body to vibrate". The present application also includes the expression "(angularly) apart from" an electrode as a reference, in order to recite the disposition of an electrode. The angle in this case refers to a value of an azimuth of each electrode, assuming that the reference electrode has an azimuth equal to zero degree. The azimuth of each electrode can be set as an azimuth of a linear line from an arbitrary point defined at the center portion of the circumference or of the annular shape of the ring-shaped vibrating body (for example, in a case where the ring-shaped vibrating body has a circular shape, the center of the circle or the like; hereinafter, this center is referred to as a "reference point") to the corresponding electrode. This linear line can be arbitrarily defined such as to pass through each electrode. This linear line can be typically defined so as to include the reference point as well as the graphic center, the center of gravity, or one of vertices of each electrode. For example, an electrode disposed 30° apart from a reference driving electrode is to be located such that the center of this electrode and the center of the reference driving electrode form an angle of 30° from the azimuth of the reference electrode. Unless otherwise specified, angles are recited in a manner that values of the angles increase clockwise. However, even with an assumption that the values of the angles increase counterclockwise, the angles recited in such a manner fall within the scope of the present invention as long as these angles satisfy the conditions defined herein.

A different vibrating gyroscope according to the present invention includes: a ring-shaped vibrating body having a uniform plane; a leg portion flexibly supporting the ring-shaped vibrating body; and a plurality of electrodes disposed on the plane of or above the ring-shaped vibrating body, and formed with at least one of an upper-layer metallic film, a lower-layer metallic film, and a piezoelectric film being sandwiched between the upper-layer metallic film and the lower-layer metallic film in a thickness direction thereof. When N is a natural number of 2 or more, the plurality of electrodes include: a group of driving electrodes for exciting a primary vibration of the ring-shaped vibrating body in a vibration mode of cos Nθ, the driving electrodes being disposed $(360/N)°$ apart from each other in a circumferential direction; a group of monitor electrodes each disposed in a region apart at an angle more than $\{(180/N)-(45/N)\}°$ and less than $\{(180/N)+(45/N)\}°$ from corresponding one of the driving electrodes; a detection electrode for detecting a secondary vibration generated upon application of an angular velocity to the ring-shaped vibrating body, the detection electrode being disposed $(90/N)°$ apart clockwise and/or counterclockwise from one of the driving electrodes; and a suppression electrode for suppressing the secondary vibration in accordance with a voltage signal outputted from the detection electrode, the suppression electrode being disposed $(90/N)°$ apart clockwise or counterclockwise from one of the driving electrodes or being disposed $(180/N)°$ apart from the detection electrode. Further, the driving electrodes, the monitor electrodes, the detection electrode, and the suppression electrode are disposed in a region from an outer peripheral edge of the ring-shaped vibrating body to a vicinity of the outer peripheral edge and/or a region from an inner peripheral edge thereof to a vicinity of the inner peripheral edge.

In this vibrating gyroscope, there are provided, in the specific region described above, on the plane of the ring-shaped vibrating body, the electrodes for applying a voltage to a piezoelectric element or obtaining a voltage signal generated due to deformation of the piezoelectric element. Therefore, the piezoelectric element functions as a single axis angular velocity sensor and is capable of exciting the primary vibration as well as detecting the secondary vibration. More specifically, this vibrating gyroscope is configured to excite the primary vibration in the plane identical with that including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrodes and the ring-shaped vibrating body with a high degree of accuracy in accordance with the dry process technique. Furthermore, because the piezoelectric element is disposed in the specific region described above, this vibrating gyroscope has a degree of flexibility so as to be applicable to the vibration mode of cos Nθ when N is a natural number of 2 or more. More specifically, because of the piezoelectric element disposed in the specific region, the vibrating gyroscope utilizing an in-plane vibration exerts driving performance, detectability, and suppressing performance. This vibrating gyroscope further includes the suppression electrode for suppressing the secondary vibration in accordance with a voltage signal outputted from the detection electrode for detecting the secondary vibration. Therefore, an S/N ratio is remarkably improved.

A different vibrating gyroscope according to the present invention includes: a ring-shaped vibrating body having a uniform plane; a leg portion flexibly supporting the ring-shaped vibrating body; and a plurality of electrodes disposed on the plane of or above the ring-shaped vibrating body, and formed with at least one of an upper-layer metallic film, a lower-layer metallic film, and a piezoelectric film being sandwiched between the upper-layer metallic film and the lower-layer metallic film in a thickness direction thereof. When N is a natural number of 2 or more, the plurality of electrodes include: a group of driving electrodes for exciting a primary vibration of the ring-shaped vibrating body in a vibration mode of cos Nθ, the driving electrodes being disposed $(360/N)°$ apart from each other in a circumferential direction; a detection electrode for detecting a secondary vibration generated upon application of an angular velocity to the ring-shaped vibrating body, the detection electrode being disposed at any angle so as to be along a vibration axis of the secondary vibration, the vibration axis of the secondary vibration being inclined at $(90/N)°$ from a vibration axis of the primary vibration generated by the driving electrodes; and a suppression electrode for suppressing the secondary vibration in accordance with a voltage signal outputted from the detection electrode. Further, the driving electrodes, the detection electrode, and the suppression electrode are disposed in a region from an outer peripheral edge of the ring-shaped vibrating body to a vicinity of the outer peripheral edge and/or a region from an inner peripheral edge thereof to a vicinity of the inner peripheral edge. It is noted that, in the present application, the vibration axis has an azimuth that allows the recited vibration to have a largest amplitude, and such an azimuth is indicated by a direction on the ring-shaped vibrating body.

In this vibrating gyroscope, there are provided, in the specific region described above, on the plane of the ring-shaped vibrating body, the electrodes for applying a voltage to a piezoelectric element or obtaining a voltage signal generated due to deformation of the piezoelectric element. Therefore, the piezoelectric element functions as a single axis angular velocity sensor and is capable of exciting the primary vibration as well as detecting the secondary vibration. More specifically, this vibrating gyroscope is configured to excite the primary vibration in the plane identical with that including the piezoelectric element on the ring-shaped vibrating body as well as to control the motions of the ring-shaped vibrating body, with no piezoelectric element being formed on a side surface of the ring-shaped vibrating body. As a result, it is possible to fabricate the electrodes and the ring-shaped vibrating body with a high degree of accuracy in accordance with the dry process technique. Furthermore, because the piezoelectric element is disposed in the specific region, this vibrating gyroscope has a degree of flexibility so as to be applicable to the vibration mode of cos Nθ when N is a natural number of 2 or more. More specifically, because of the piezoelectric element disposed in the specific region, the vibrating gyroscope utilizing an in-plane vibration exerts driving performance, detectability, and suppressing performance. This vibrating gyroscope further includes the suppression electrode for suppressing the secondary vibration in accordance with a voltage signal outputted from the detection electrode for detecting the secondary vibration. Therefore, an S/N ratio is remarkably improved.

According to the present invention, a method for manufacturing a vibrating gyroscope includes the steps of: forming an insulative film uniformly on a silicon substrate; forming a lower-layer metallic film uniformly on the insulative film; forming a piezoelectric film uniformly on the lower-layer metallic film; forming an upper-layer metallic film uniformly on the piezoelectric film; patterning a first resist film on the upper-layer metallic film; dry etching the upper-layer metallic film to expose the piezoelectric film; and patterning a second resist film on the upper-layer metallic film and the piezoelectric film. The method for manufacturing a vibrating gyroscope further includes, after the patterning described above, the step in which the lower-layer metallic film, the insulative film, and the silicon substrate are dry etched, using the second resist film, the upper-layer metallic film, or the piezoelectric film as an etching mask, to form a ring-shaped vibrating body, and a leg portion flexibly supporting the ring-shaped vibrating body and having a fixed end, as well as to form, when N is a natural number of 2 or more, a group of driving electrodes for exciting a primary vibration of the ring-shaped vibrating body in a vibration mode of cos Nθ, the driving electrodes being disposed $(360/N)°$ apart from each other in a circumferential direction, a detection electrode for detecting a secondary vibration generated upon application of an angular velocity to the ring-shaped vibrating body, the detection electrode being disposed $(90/N)°$ apart clockwise and/or counterclockwise from corresponding one of the driving electrodes, and a suppression electrode for suppressing the secondary vibration in accordance with a voltage signal outputted from the detection electrode, the suppression electrode being disposed $(90/N)°$ apart clockwise or counterclockwise from corresponding one of the driving electrodes or being disposed $(180/N)°$ apart from the detection electrode.

The method for manufacturing a vibrating gyroscope enables fabrication with a high degree of accuracy in accordance with the dry process technique. Therefore, a piezoelectric element can be formed in the specific region on the plane of the ring-shaped vibrating body. As a result, it is possible to manufacture the vibrating gyroscope in which, with no piezoelectric element being provided on a side surface of the ring-shaped vibrating body, only the piezoelectric element on the plane functions as a single axis angular velocity sensor and is capable of exciting the primary vibration as well as detecting the secondary vibration, so that an S/N ratio is improved remarkably.

Further, because the ring-shaped vibrating body is formed with the silicon substrate, it is possible to apply the known silicon trench etching technique with an adequately high selectivity to the resist film. Even in a case where the resist film disappears, there is provided an adequate selectivity such that the upper-layer metallic film or the piezoelectric film layered therebelow serves as a mask for etching silicon.

According to the present invention, a different method for manufacturing a vibrating gyroscope includes the steps of: forming an insulative film uniformly on a silicon substrate; forming a lower-layer metallic film uniformly on the insulative film; forming a piezoelectric film uniformly on the lower-layer metallic film; forming an upper-layer metallic film uniformly on the piezoelectric film; patterning a first resist film on the upper-layer metallic film; dry etching the upper-layer metallic film and the piezoelectric film, using the first resist film as an etching mask, to expose the lower-layer metallic film; and patterning a second resist film on the upper-layer metallic film and the lower-layer metallic film. This different method for manufacturing a vibrating gyroscope further includes, after the patterning described above, the step in which the insulative film and the silicon substrate are dry etched, using the second resist film, the upper-layer metallic film, or the lower-layer metallic film as an etching mask, to form a ring-shaped vibrating body, and a leg portion flexibly supporting the ring-shaped vibrating body and having a fixed end, as well as to form, when N is a natural number of 2 or more, a group of driving electrodes for exciting a primary vibration of the ring-shaped vibrating body in a vibration mode of cos Nθ, the driving electrodes being disposed $(360/N)°$ apart from each other in a circumferential direction, a detection electrode for detecting a secondary vibration generated upon application of an angular velocity to the ring-shaped vibrating body, the detection electrode being disposed (90/N)° apart clockwise and/or counterclockwise from corresponding one of the driving electrodes, and a suppression electrode for suppressing the secondary vibration in accordance with a voltage signal outputted from the detection electrode, the suppression electrode being disposed (90/N)° apart clockwise or counterclockwise from corresponding one of the driving electrodes or being disposed (180/N)° apart from the detection electrode.

This method for manufacturing a vibrating gyroscope also enables fabrication with a high degree of accuracy in accordance with the dry process technique. Therefore, a piezoelectric element can be formed in the specific region on the plane of the ring-shaped vibrating body. As a result, it is possible to manufacture the vibrating gyroscope in which, with no piezoelectric element being provided on a side surface of the ring-shaped vibrating body, only the piezoelectric element on the plane functions as a single axis angular velocity sensor and is capable of exciting the primary vibration as well as detecting the secondary vibration, so that an S/N ratio is improved remarkably.

Effects of the Invention

In a vibrating gyroscope according to the present invention, a primary vibration can be excited in a plane identical with that including a piezoelectric element on a ring-shaped vibrating body, and motions of the ring-shaped vibrating body can be controlled, with no piezoelectric element being formed on a side surface of the ring-shaped vibrating body. Further, it is possible to fabricate electrodes and the ring-shaped vibrating body with a high degree of accuracy in accordance with the dry process technique that is applied to the plane of the ring-shaped vibrating body. Furthermore, because the piezoelectric element is disposed in a specific region, this vibrating gyroscope has a degree of flexibility so as to be applicable to a vibration mode of cos Nθ when N is a natural number of 2 or more. More specifically, because of the piezoelectric element disposed in the specific region described above, the vibrating gyroscope utilizing an in-plane vibration exerts driving performance, detectability, and suppressing performance.

Further, a method for manufacturing a vibrating gyroscope according to the present invention enables fabrication with a high degree of accuracy in accordance with the dry process technique. Therefore, a piezoelectric element can be formed in a specific region on a plane of a ring-shaped vibrating body. As a result, it is possible to manufacture the vibrating gyroscope in which, with no piezoelectric element being provided on a side surface of the ring-shaped vibrating body, only the piezoelectric element on the plane functions as a single axis angular velocity sensor and is capable of exciting a primary vibration as well as detecting a secondary vibration, so that an S/N ratio is improved remarkably.

Figure 1:
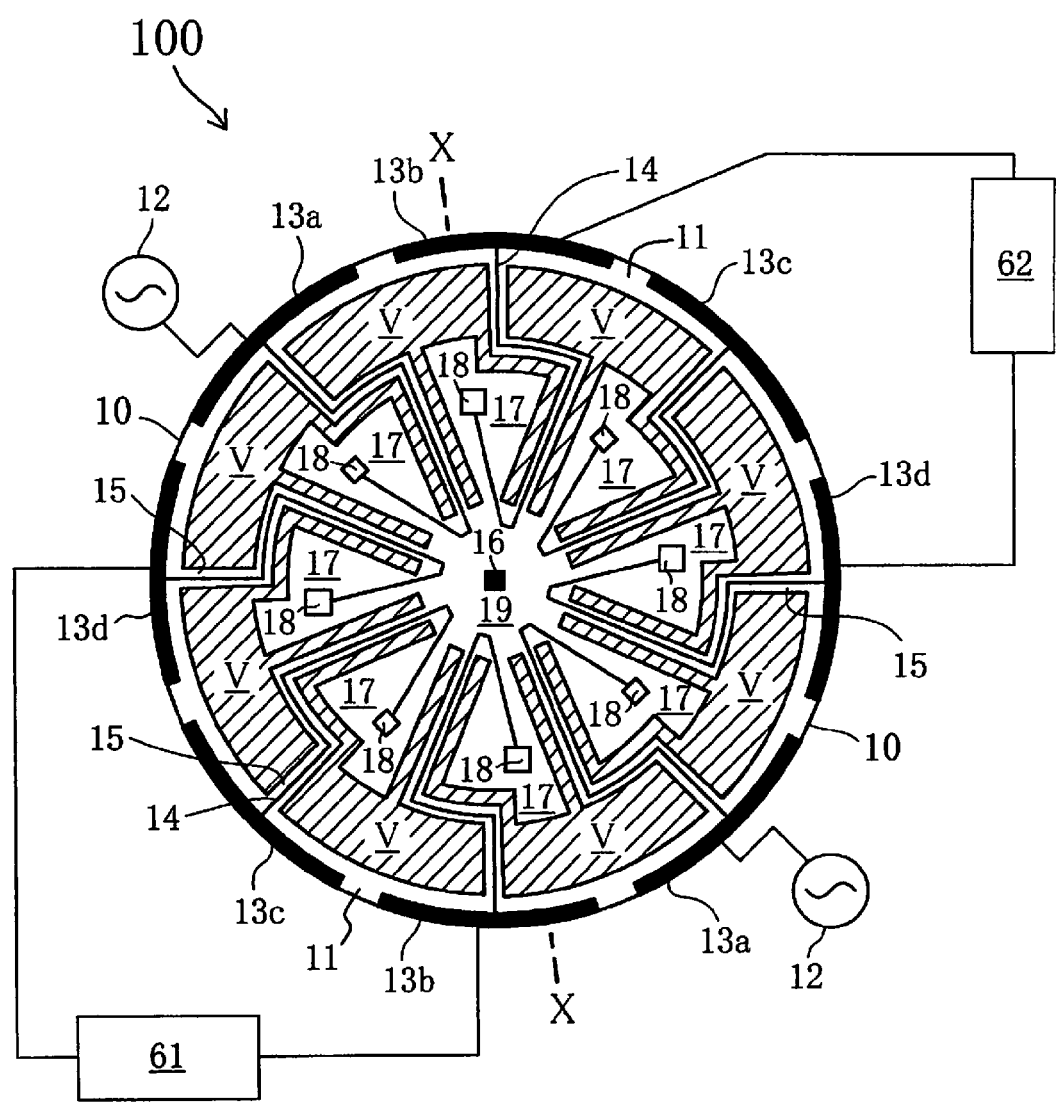
FIG. 1 is a front view of a structure having a principal function in a ring-shaped vibrating gyroscope according to an embodiment of the present invention.

DESCRIPTION OF SYMBOLS 10 silicon substrate
11, 11a, 11b ring-shaped vibrating body
12 alternating-current power supply
13a driving electrode
13b detection electrode or first detection electrode
13c, 413c, 513c, 613c, 713c, 753c monitor electrode
13d suppression electrode
13e second detection electrode
14 metal track
15 leg portion
16 fixed potential electrode (ground electrode)
17 electrode pad fixed end
18 electrode pad
19 post
20 silicon oxide film
30 lower-layer metallic film
40 piezoelectric film
50 upper-layer metallic film
61, 62 feedback control circuit
63 arithmetic circuit
100, 110, 120, 200, 300, 400, 500, 600, 700, 750, 800, 820, 830, 840, 900, 950 ring-shaped vibrating gyroscope

MODE FOR CARRYING OUT THE INVENTION

Embodiments of the present invention are described in detail with reference to the accompanying drawings. In this disclosure, common parts are denoted by common reference symbols in all the drawings unless otherwise specified. Further, in these drawings, the elements of these embodiments are not necessarily illustrated in accordance with the same scale. Some of the symbols or the constituent elements may not be indicated in the drawings for the purpose of simplification in appearance of the drawings.

First Embodiment

Figure 2A:
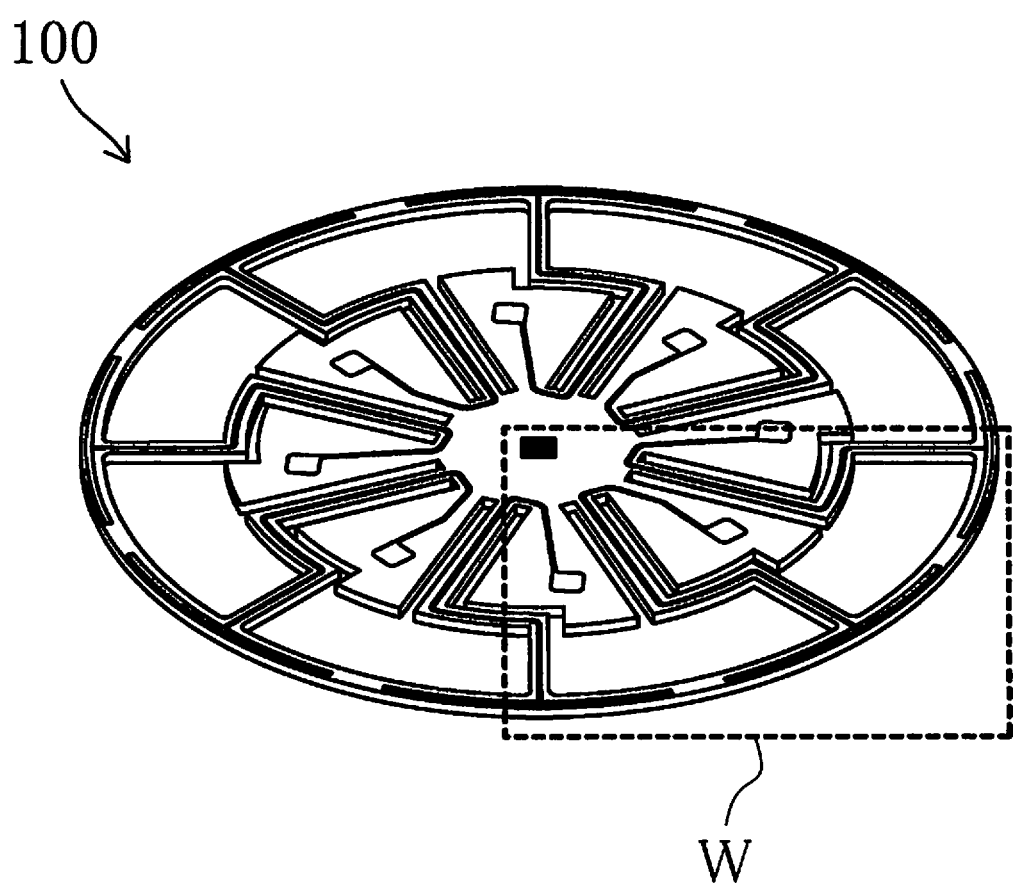
FIG. 2A is a perspective view of the structure shown in FIG. 1.
Figure 2B:
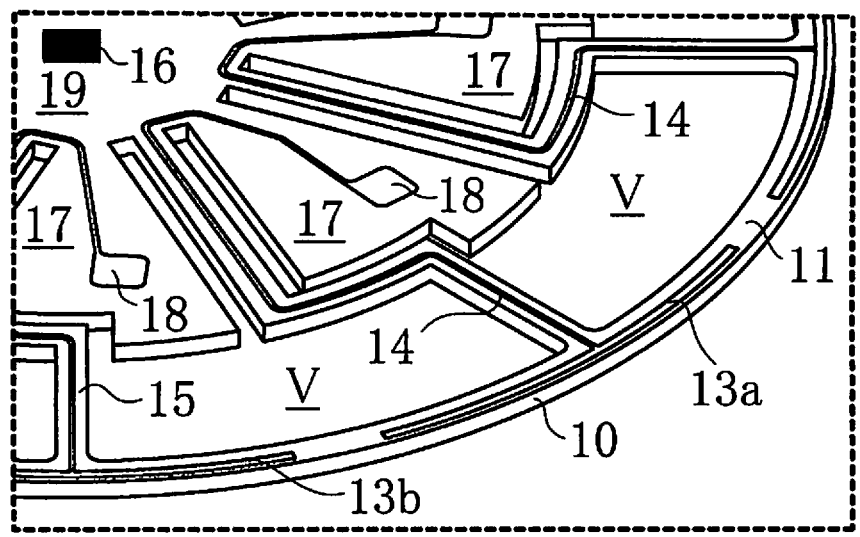
FIG. 2B is an enlarged view of a portion (W portion) shown in FIG. 2A.
Figure 3:
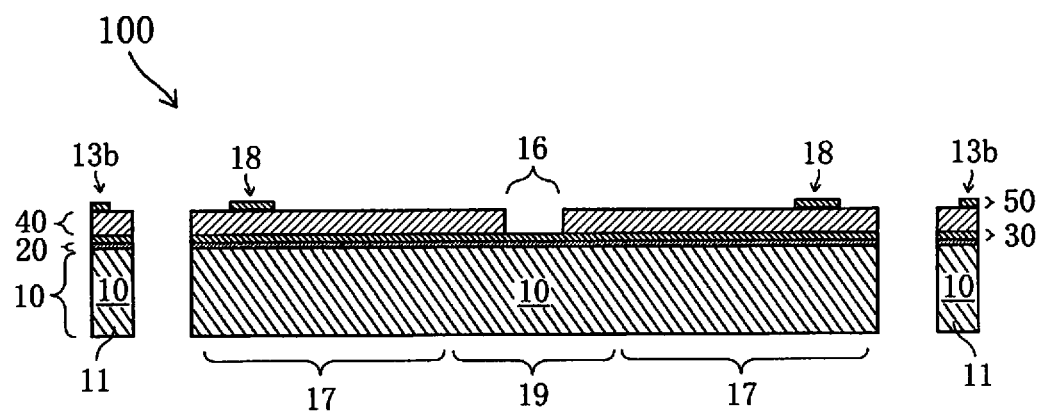
FIG. 3 is a sectional view taken along line X-X of FIG. 1.

FIG. 1 is a front view of a structure having a principal function in a ring-shaped vibrating gyroscope 100 according to the present embodiment. FIG. 2A is a perspective view of the structure shown in FIG. 1. FIG. 2B is an enlarged view of a portion (W portion) shown in FIG. 2A. FIG. 3 is a sectional view taken along line X-X of FIG. 1.

As shown in FIGS. 1 to 3, the ring-shaped vibrating gyroscope 100 according to the present embodiment is generally divided into three areas. A first area includes a ring-shaped vibrating body 11 formed with a silicon substrate 10, a silicon oxide film 20 provided on an upper plane (hereinafter, referred to as an upper surface) of the ring-shaped vibrating body 11, and a plurality of electrodes 13a to 13d formed thereon with a lower-layer metallic film 30, an upper-layer metallic film 50, and a piezoelectric film 40 being sandwiched therebetween. In the present embodiment, the upper-layer metallic film 50 configuring the plurality of electrodes 13a to 13d has an outer end formed inside by approximately 1 μm with respect to the outer peripheral edge of the ring-shaped vibrating body 11 that has a ring-shaped plane of approximately 40 μm wide, so as to be approximately 18 μm wide. The upper-layer metallic film 50 is formed outside a line connecting centers (hereinafter, simply referred to as a center line) between the both ends in the width direction of the ring-shaped plane that serves as the upper surface of the ring-shaped vibrating body 11.

In the present embodiment, a primary vibration of the ring-shaped vibrating gyroscope 100 is excited in a vibration mode of cos 2θ. Thus, the plurality of electrodes 13a to 13d are categorized into groups (a) to (d) detailed below:
(a) two driving electrodes 13a, 13a that are disposed 180° apart from each other in the circumferential direction;
(b) two monitor electrodes 13c, 13c that are disposed 90° apart from the driving electrodes 13a, 13a respectively in the circumferential direction;
(c) detection electrodes 13b, 13b for detecting a secondary vibration generated upon application of an angular velocity to the ring-shaped vibrating gyroscope 100; and
(d) suppression electrodes 13d, 13d for suppressing the secondary vibration in accordance with voltage signals outputted from the detection electrodes.

In the present embodiment, the detection electrodes 13b, 13b are disposed 45° apart clockwise from the driving electrodes 13a, 13a respectively in the circumferential direction. The suppression electrodes 13d, 13d are disposed 90° apart from the detection electrodes respectively in the circumferential direction, in other words, 45° apart counterclockwise from the driving electrodes 13a, 13a respectively in the circumferential direction. Further in a different expression, each of the detection electrodes 13b, 13b and the suppression electrodes 13d, 13d is disposed on a vibration axis of the secondary vibration generated upon application of an angular velocity to the ring-shaped vibrating body 11. This vibration axis of the secondary vibration is inclined at 45° from the vibration axis of the primary vibration that is generated by the driving electrodes 13a, 13a.

In the present embodiment, the lower-layer metallic film 30 and the upper-layer metallic film 50 are 100 nm thick, respectively, and the piezoelectric film 40 is 3 μm thick. Further, the silicon substrate 10 is 100 μm thick. Each of the regions marked by diagonal lines and denoted by symbol V in FIG. 1 or each of the regions denoted by symbol V in FIG. 2B is a spaced or void portion in which there exists no structure configuring the ring-shaped vibrating gyroscope 100. These regions are provided expediently for the purpose of easier comprehension of these figures.

A second area includes leg portions 15, . . . , 15 each of which is connected to a part of the ring-shaped vibrating body 11. These leg portions 15, . . . , 15 are also formed with the silicon substrate 10. Formed on the entire upper surfaces of the leg portions 15, . . . , 15 are the silicon oxide film 20, the lower-layer metallic film 30, and the piezoelectric film 40 described above, which are provided continuously to the portions of the respective films on the ring-shaped vibrating body 11. Further formed on the center line on the upper surface of the piezoelectric film 40 is the upper-layer metallic film 50 which serves as metal tracks 14, . . . , 14 of approximately 8 μm wide.

A third area includes a post 19 that is formed with the silicon substrate 10 and is connected to the leg portions 15, . . . , 15 described above, and electrode pad fixed ends 17, . . . , 17 that are provided with electrode pads 18, . . . , 18, respectively. In the present embodiment, the post 19 is connected to a package portion (not shown) of the ring-shaped vibrating gyroscope 100 and serves as a fixed end. The ring-shaped vibrating gyroscope 100 according to the present embodiment is provided with the electrode pad fixed ends 17, . . . , 17 that serve as fixed ends other than the post 19. The electrode pad fixed ends 17, . . . , 17 are connected only to the post 19 and the package portion referred to above, thereby substantially not disturbing the motions of the ring-shaped vibrating body 11. Further, as shown in FIG. 3, formed on the upper surfaces of the post 19 and the electrode pad fixed ends 17, . . . , 17 are the silicon oxide film 20, the lower-layer metallic film 30, and the piezoelectric film 40 described above, which are provided continuously to the portions of the respective films on the leg portions 15, . . . , 15, except for the portion of the fixed potential electrode 16 functioning as a ground electrode. In this case, the lower-layer metallic film 30 formed on the silicon oxide film 20 functions as the fixed potential electrode 16. On the upper surface of the piezoelectric film 20 that is provided on the post 19 and the electrode pad fixed ends 17, . . . , 17, there are formed the electrode pads 18, . . . , 18 as well as the metal tracks 14, . . . , 14 that are provided continuously to the portions of the metal tracks on the leg portions 15, . . . , 15.

Described next with reference to FIGS. 4A to 4F is a method for manufacturing the ring-shaped vibrating gyroscope 100 according to the present embodiment. Each of FIGS. 4A to 4F is a sectional view partially showing the portion shown in FIG. 3.

Figure 4A:
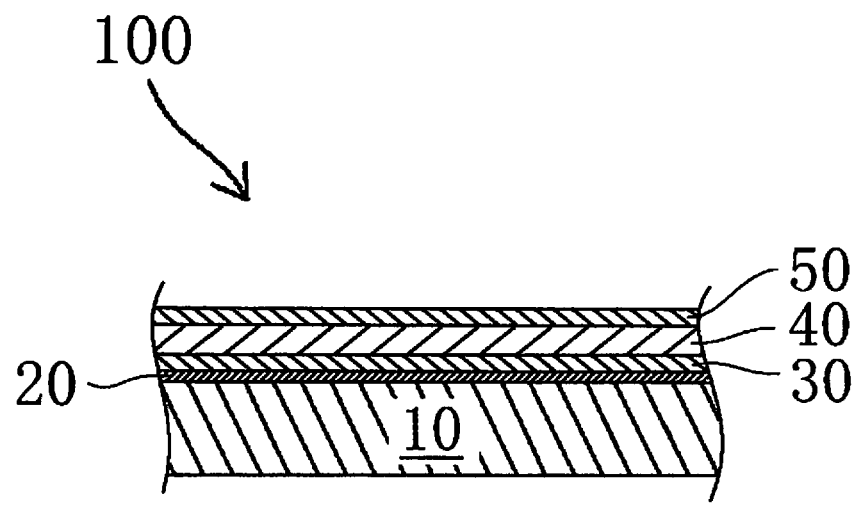
FIG. 4A is a sectional view showing a process in the steps of manufacturing a part of the ring-shaped vibrating gyroscope according to the embodiment of the present invention.
Figure 4B:
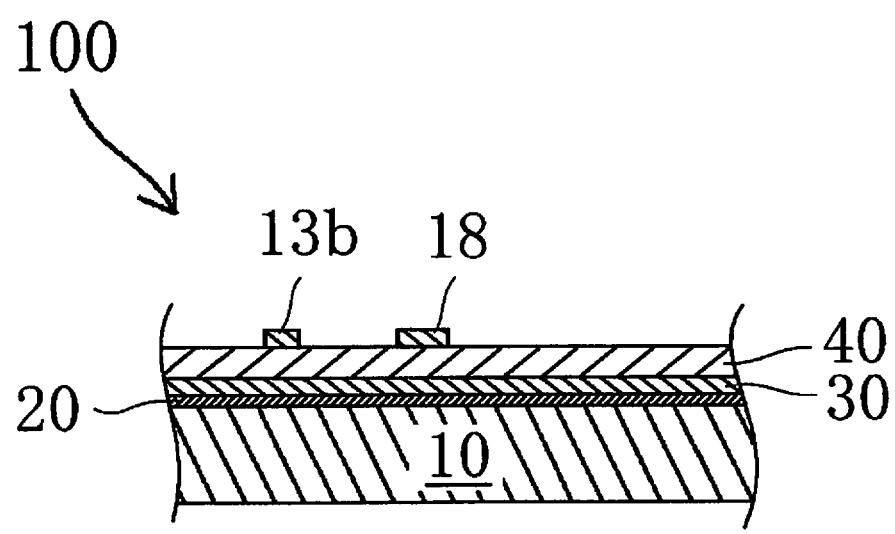
FIG. 4B is a sectional view showing a process in the steps of manufacturing the part of the ring-shaped vibrating gyroscope according to the embodiment of the present invention.

Firstly, as shown in FIG. 4A, laminated on the silicon substrate 10 are the silicon oxide film 20, the lower-layer metallic film 30, the piezoelectric film 40, and the upper-layer metallic film 50. Each of these films is formed by known film formation means. In the present embodiment, the silicon oxide film 20 is a thermally oxidized by known means. The lower-layer metallic film 30, the piezoelectric film 40, and the upper-layer metallic film 50 are each formed in accordance with a known sputtering method. It is noted that formation of each of these films is not limited to the example described above but these films may be alternatively formed by any other known means.

The upper-layer metallic film 50 is then partially etched. In the present embodiment, there is formed a known resist film on the upper-layer metallic film 50, and dry etching is then performed on the basis of a pattern formed in accordance with the photolithographic technique, so that formed is the upper-layer metallic film 50 shown in FIG. 4B. In this case, the upper-layer metallic film 50 was dry etched under the condition for the known reactive ion etching (RIE) using argon (Ar) or mixed gas containing argon (Ar) and oxygen ($O_2$).

Figure 4C:
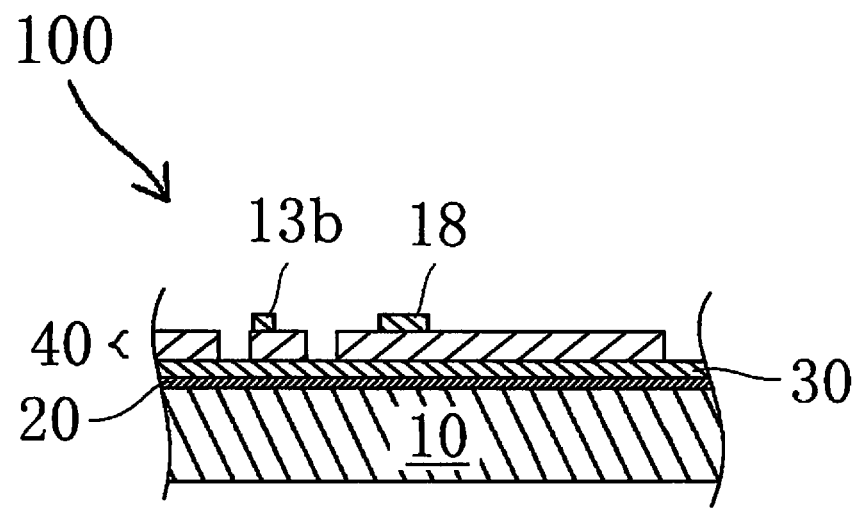
FIG. 4C is a sectional view showing a process in the steps of manufacturing the part of the ring-shaped vibrating gyroscope according to the embodiment of the present invention.

Thereafter, as shown in FIG. 4C, the piezoelectric film 40 is partially etched. Firstly, similarly to the above, the piezoelectric film 40 is dry etched on the basis of the resist film that is patterned in accordance with the photolithographic technique. In the present embodiment, the piezoelectric film 40 was dry etched under the condition for the known reactive ion etching (RIE) using mixed gas containing argon (Ar) and $C_2F_6$ gas, or mixed gas containing argon (Ar), $C_2F_6$ gas, and $CHF_3$ gas.

Figure 4D:
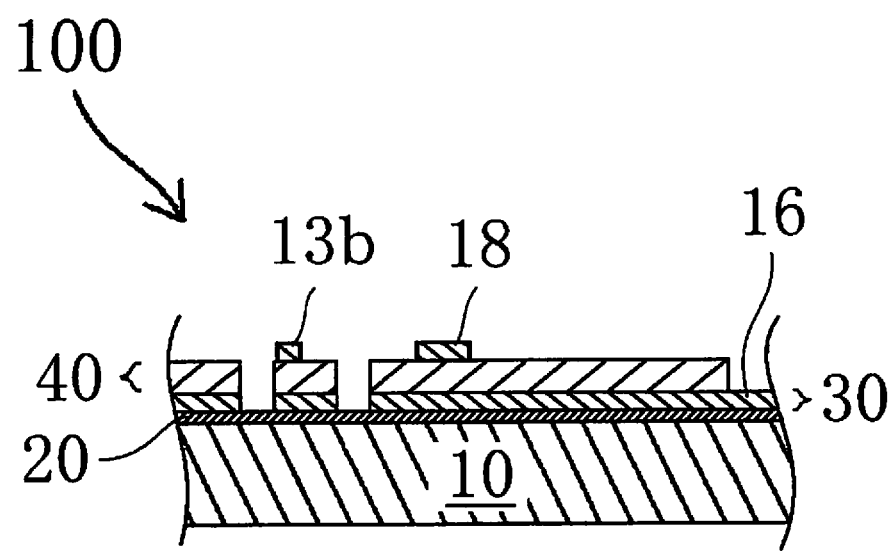
FIG. 4D is a sectional view showing a process in the steps of manufacturing the part of the ring-shaped vibrating gyroscope according to the embodiment of the present invention.

Subsequently, as shown in FIG. 4D, the lower-layer metallic film 30 is partially etched. In the present embodiment, dry etching is performed using the resist film that is again patterned in accordance with the photolithographic technique, so as to form the fixed potential electrode 16 including the lower-layer metallic film 30. In the present embodiment, the fixed potential electrode 16 is utilized as the ground electrode. According to the present embodiment, the lower-layer metallic film 30 was dry etched under the condition for the known reactive ion etching (RIE) using argon (Ar) or mixed gas containing argon (Ar) and oxygen ($O_2$).

In the present embodiment, the resist film is formed to be approximately 4 μm thick so that the silicon oxide film 20 and the silicon substrate 10 are then continuously etched with the above resist film formed again serving as an etching mask. However, even in a case where this resist film disappears during etching the silicon substrate 10, the selectivity of the etching rate relative to an etchant applied to the silicon substrate 10 functions advantageously. Therefore, performance of the lower-layer metallic film 30 is substantially not affected by the above etching.

Figure 4E:
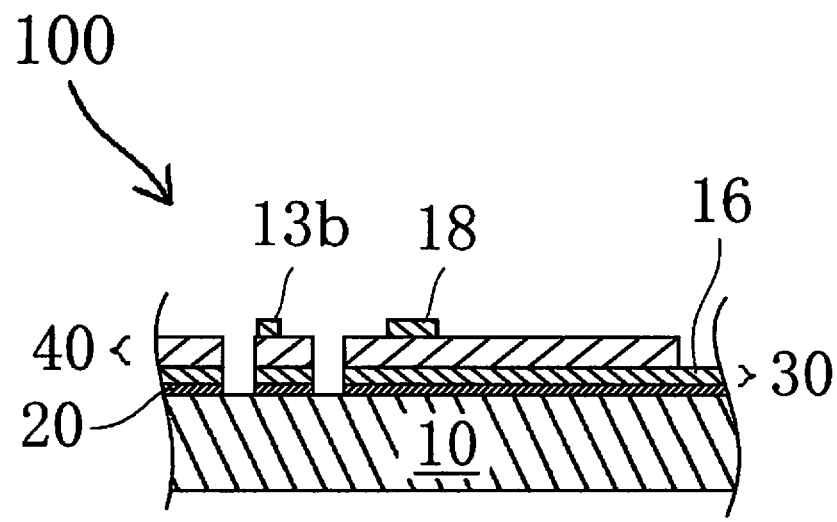
FIG. 4E is a sectional view showing a process in the steps of manufacturing the part of the ring-shaped vibrating gyroscope according to the embodiment of the present invention.
Figure 4F:
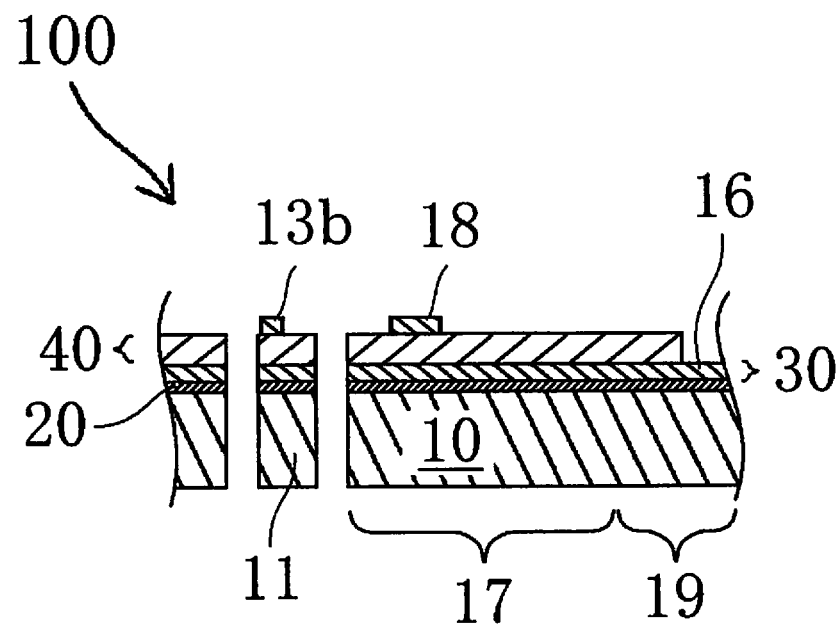
FIG. 4F is a sectional view showing a process in the steps of manufacturing the part of the ring-shaped vibrating gyroscope according to the embodiment of the present invention.

Thereafter, as shown in FIGS. 4E and 4F, the silicon oxide film 20 and the silicon substrate 10 are dry etched as described above using the resist film that is provided for etching the lower-layer metallic film 30. In the present embodiment, the silicon oxide film 20 was dry etched under the condition for the known reactive ion etching (RIE) using argon (Ar) or mixed gas containing argon (Ar) and oxygen ($O_2$). The known silicon trench etching technique is applied as the condition for dry etching the silicon substrate 10 in the present embodiment. In this case, the silicon substrate 10 is etched so as to be penetrated. Thus, the dry etching described above is performed in a state where a protective substrate, which prevents a stage to allow the silicon substrate 10 to be mounted thereon from being exposed to plasma upon penetration, is attached to the silicon substrate 10 with grease of high thermal conductivity or the like so as to form a layer under the silicon substrate 10. Accordingly, it is a preferable aspect to adopt the dry etching technique disclosed in Japanese Unexamined Patent Publication No. 2002-158214, for example, in order to prevent corrosion of a surface perpendicular to the thickness direction of the silicon substrate 10, in other words, an etching side surface, after the penetration.

As described above, the silicon substrate 10 and the respective films laminated on the silicon substrate 10 are etched to form the principal structure of the ring-shaped vibrating gyroscope 100. Subsequently performed are the step of accommodating the principal structure into the package by known means as well as the step of wiring. As a result, there is obtained the ring-shaped vibrating gyroscope 100.

Described below are the functions of the respective electrodes included in the ring-shaped vibrating gyroscope 100. As described earlier, excited in the present embodiment is the primary vibration in the vibration mode of cos 2θ. Because the fixed potential electrode 16 is grounded, the lower-layer metallic film 30, which is provided continuously to the portion on the fixed potential electrode 16, is uniformly set to 0 V.

As shown in FIG. 1, firstly, an alternating-current voltage of 1 VP-0 is applied to each of the two driving electrodes 13a, 13a. As a result, the piezoelectric film 40 is expanded and contracted to excite a primary vibration. In the present embodiment, the upper-layer metallic film 50 is formed outside the center line on the upper surface of the ring-shaped vibrating body 11. Accordingly, it is possible to convert the expansion/contraction motions of the piezoelectric film 40 into the primary vibration of the ring-shaped vibrating body 11 with no upper-layer metallic film 50 being provided on a side surface of the ring-shaped vibrating body 11.

Then, each of the monitor electrodes 13c, 13c shown in FIG. 1 detects the amplitude and the resonant frequency of the above primary vibration, and transmits a signal to a known feedback control circuit (not shown). This feedback control circuit controls such that the frequency of the alternating-current voltage applied to each of the driving electrodes 13a, 13a is equal to the natural frequency of the ring-shaped vibrating body 11, as well as controls using the signals outputted from the monitor electrodes 13c, 13c such that the amplitude of the ring-shaped vibrating body 11 has a constant value. As a result, the ring-shaped vibrating body 11 is vibrated constantly and continuously.

After the primary vibration described above is excited, upon application of an angular velocity about an axis perpendicular to the plane on which the ring-shaped vibrating gyroscope 100 shown in FIG. 1 is disposed (the axis perpendicular to the drawing sheet, which is hereinafter simply referred to also as a "perpendicular axis"), in the present embodiment having the vibration mode of cos 2θ, caused by a coriolis force is a secondary vibration having a new vibration axis that is inclined at 45° to either side from the vibration axis of the primary vibration.

This secondary vibration is detected by the two detection electrodes 13b, 13b. In this case, the ring-shaped vibrating gyroscope 100 according to the present embodiment includes feedback control circuits 61 and 62. These feedback control circuits 61 and 62 instruct or control to apply a specific voltage to each of the suppression electrodes 13d, 13d, so as to cancel the voltage signals related to the secondary vibration detected by these detection electrodes 13b, 13b, in other words, in order to set the values of these voltage signals to zero. It is noted that this specific voltage is used as a resultant output of the vibrating gyroscope.

As described earlier, there are provided the suppression electrodes 13d, 13d that suppress the secondary vibration in accordance with the voltage signals outputted from the detection electrodes 13b, 13b. Accordingly, the ring-shaped vibrating gyroscope 100 can exert performance as a vibrating gyroscope with almost no secondary vibration being caused to the ring-shaped vibrating body 11. It is noted that the ring-shaped vibrating gyroscope 100 according to the present embodiment is significantly excellent in noise performance in comparison to a vibrating gyroscope that does not include the suppression electrodes 13d, 13d and the feedback control circuits 61 and 62. More specifically, the ring-shaped vibrating gyroscope 100 according to the present embodiment generates noise of a volume, particularly in the low frequency region, which is only a half or less of that of an exemplary vibrating gyroscope (the vibrating gyroscope according to the first embodiment) disclosed in PCT/JP2008/071372, as having previously been proposed by the applicant of the present invention. Accordingly, the S/N ratio can be remarkably improved without deteriorating responsiveness. It is noted that any known feedback control circuit is applicable to each one of the above feedback control circuits 61 and 62.

On the other hand, assume a case where there is generated a disturbance exciting a vibration in the rocking mode in the present embodiment. As shown in FIG. 1 for example, because the detection electrodes 13b, 13b are disposed 180° apart from each other in the circumferential direction, possibly generated expansion/contraction motions of the piezoelectric film 40 at the locations on the leg portions connected to the respective detection electrodes 13b, 13b are reverse to each other. As a result, the respective detection electrodes 13b generate electrical signals of positive/negative polarities inverse to each other. Accordingly, these electrical signals are to be canceled each other. Consequently, the motions of the ring-shaped vibrating gyroscope 100 are substantially not affected by the vibration in the rocking mode.

As described above, the ring-shaped vibrating gyroscope 100 according to the present embodiment includes the two detection electrodes 13b, 13b and the two suppression electrodes 13d, 13d. Improved therefore are detectability for a secondary vibration as well as resistance to an external impact that excites a vibration in the rocking mode.

Second Embodiment

Figure 5:
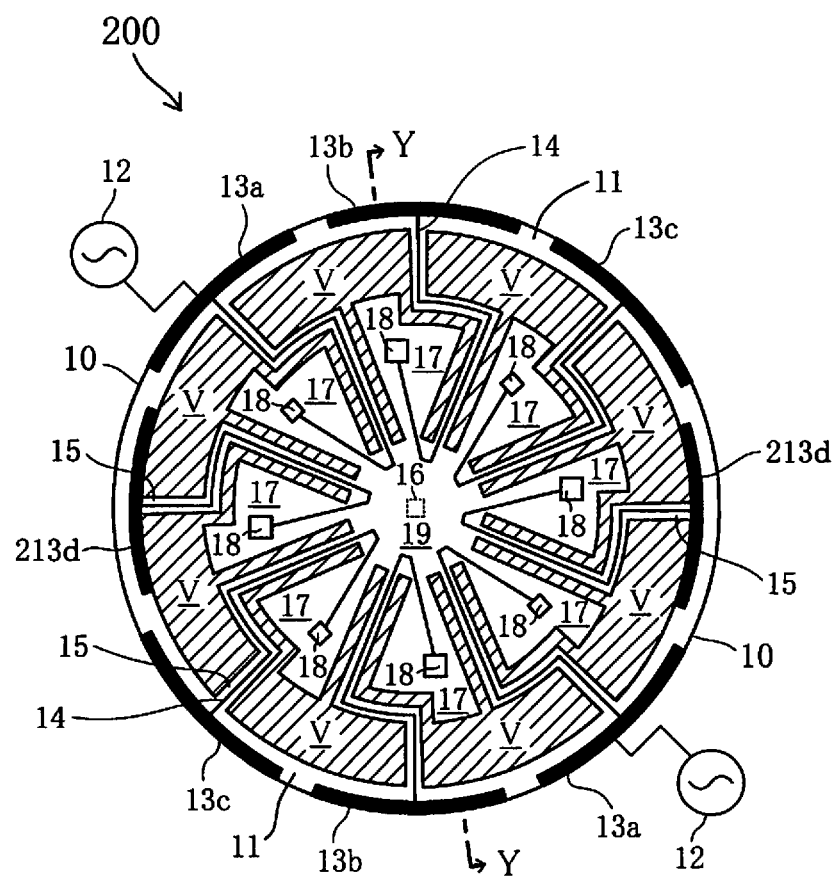
FIG. 5 is a front view of a structure having a principal function in a ring-shaped vibrating gyroscope according to a different embodiment of the present invention.
Figure 6:
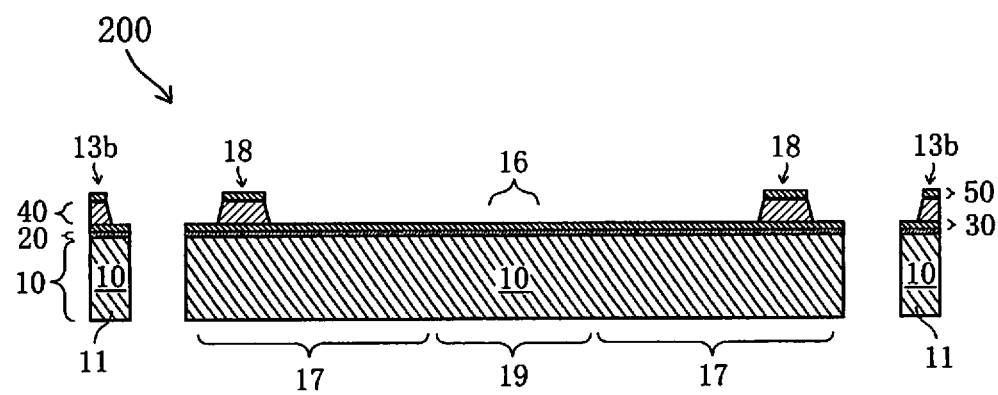
FIG. 6 is a sectional view taken along line Y-Y of FIG. 5.

FIG. 5 is a front view of a structure having a principal function in a different ring-shaped vibrating gyroscope 200 according to the present embodiment. FIG. 6 is a sectional view taken along line Y-Y of FIG. 5. The ring-shaped vibrating gyroscope 200 according to the present embodiment is configured identically with the ring-shaped vibrating gyroscope 100 of the first embodiment, except for the configurations of the piezoelectric film 40 and the upper-layer metallic film 50 in the first embodiment. The manufacturing method therefor is identical with that of the first embodiment except for some steps. Further, the vibration mode in the present embodiment is of cos 2θ as in the first embodiment. Accordingly, the description duplicating with that of the first embodiment may not be repeatedly provided. In FIG. 5, the feedback control circuits 61 and 62 of FIG. 1 are not illustrated expediently for the purpose of simplification in appearance of the figure.

As shown in FIGS. 5 and 6, the ring-shaped vibrating gyroscope 200 according to the present embodiment includes suppression electrodes 213d, 213d in place of the suppression electrodes 13d, 13d of the first embodiment. In the present embodiment, the outer end of the upper-layer metallic film 50 at each of the locations of the suppression electrodes 213d, 213d is formed inside by approximately 1 μm with respect to the inner peripheral edge of the ring-shaped vibrating body 11, so as to be approximately 18 μm wide. The upper-layer metallic film 50 at the location of each of these electrodes is formed inside the center line on the ring-shaped plane of the ring-shaped vibrating body 11.

As shown in FIG. 6, in the present embodiment, the piezoelectric film 40 is etched substantially in correspondence with the region where the upper-layer metallic film 50 is formed. The alternating-current voltage applied to the upper-layer metallic film 50 is thus directed only in the vertically downward direction with no influence of the region formed with the lower-layer metallic film 30. Prevented therefore are undesired expansion and contraction motions of the piezoelectric film 40 as well as transmission of an electrical signal. In the present embodiment, after the step of dry etching the upper-layer metallic film 50, dry etching is subsequently performed under the condition same as that of the first embodiment with the residual resist film on the upper-layer metallic film 50 or the upper-layer metallic film 50 itself serving as an etching mask. As a result, there is formed the piezoelectric film 40 described above. Further, as shown in FIG. 6, the piezoelectric film 40 is etched so as to have an inclined shape (at an inclination angle of 75°, for example) in the present embodiment. However, the piezoelectric film 40 having such steep inclination as shown in FIG. 6 is dealt in the present application as being substantially visually unrecognized, as compared to other regions, in the front view of the ring-shaped vibrating gyroscope 200 shown in FIG. 5.

When an angular velocity about the perpendicular axis (in the direction perpendicular to the drawing sheet) of the ring-shaped vibrating gyroscope 200 is applied to the ring-shaped vibrating gyroscope 200, of which a primary vibration similar to that of the first embodiment is excited, a secondary vibration thereof is detected by the two detection electrodes 13b, 13b. The ring-shaped vibrating gyroscope 200 according to the present embodiment also includes the feedback control circuits (not shown) which instruct or control to apply a specific voltage to each of the suppression electrodes 213d, 213d, so as to reduce or cancel the voltage signals related to the secondary vibration detected by the detection electrodes 13b, 13b. It is noted that this specific voltage is used as a resultant output of the vibrating gyroscope.

There are provided the suppression electrodes 213d, 213d that suppress the secondary vibration in accordance with the voltage signals outputted from the detection electrodes 13b, 13b. Therefore, the ring-shaped vibrating gyroscope 200 can exert performance as a vibrating gyroscope remarkably excellent in responsiveness and detectability, with almost no secondary vibration being caused to the ring-shaped vibrating body 11.

In the present embodiment, formed on the leg portions 15, ..., 15 are the upper-layer metallic film 50 which serves as the metal tracks 14, the piezoelectric film 40, and the lower-layer metallic film 30. Assume a case where there is generated a disturbance exciting a vibration in the rocking mode. As shown in FIG. 5 for example, because the detection electrodes 13b, 13b are disposed 180° apart from each other in the circumferential direction, possibly generated expansion/contraction motions of the piezoelectric film 40 at the locations on the leg portions connected to the respective detection electrodes 13b, 13b are reverse to each other. As a result, the respective detection electrodes 13b generate electrical signals of positive/negative polarities inverse to each other. Accordingly, these electrical signals are to be canceled each other.

As described above, the ring-shaped vibrating gyroscope 200 according to the present embodiment includes the two detection electrodes 13b, 13b and the two suppression electrodes 213d, 213d. Improved therefore are detectability for a secondary vibration as well as resistance to an external impact that excites a vibration in the rocking mode.

Third Embodiment

Figure 7:
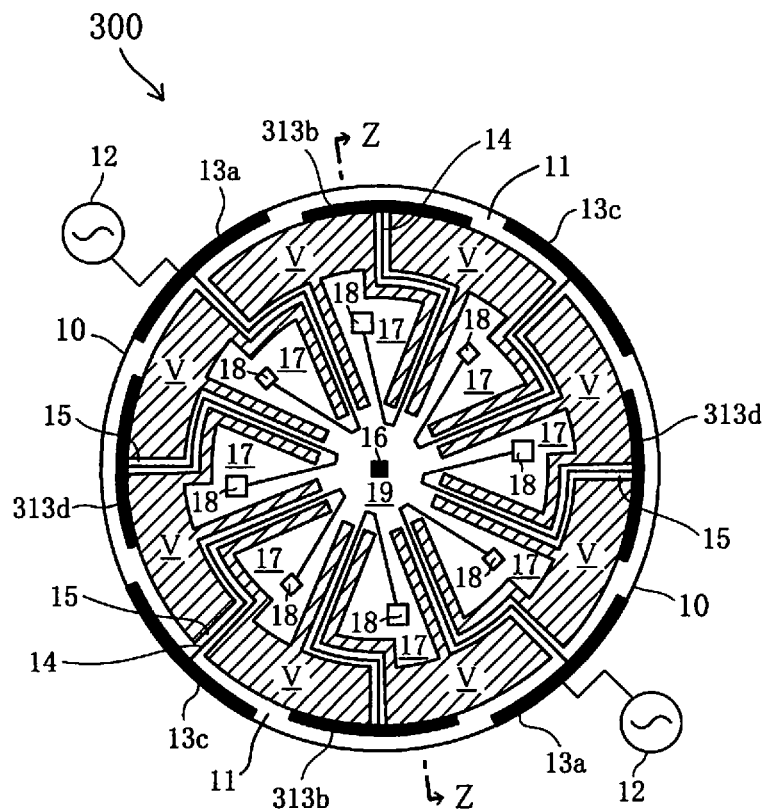
FIG. 7 is a front view of a structure having a principal function in a ring-shaped vibrating gyroscope according to a different embodiment of the present invention.
Figure 8:
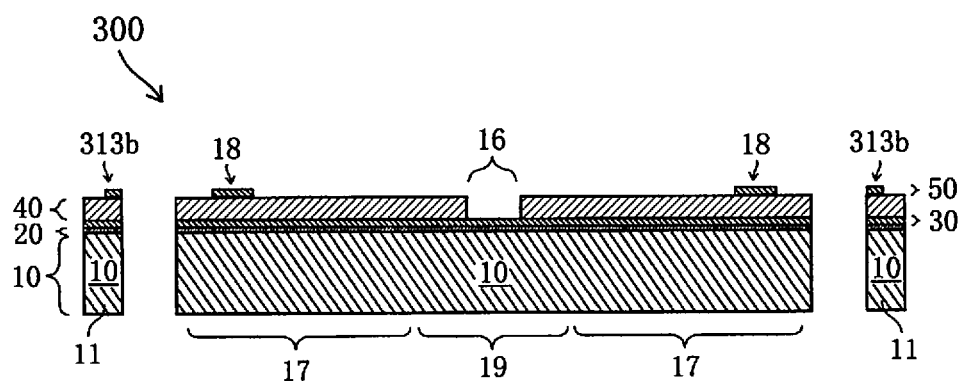
FIG. 8 is a sectional view taken along line Z-Z of FIG. 7.

FIG. 7 is a front view of a structure having a principal function in a different ring-shaped vibrating gyroscope 300 according to the present embodiment. FIG. 8 is a sectional view taken along line Z-Z of FIG. 7. The ring-shaped vibrating gyroscope 300 according to the present embodiment is configured identically with the ring-shaped vibrating gyroscope 100 of the first embodiment, except for the location of the upper-layer metallic film 50 in the first area in the first embodiment. The manufacturing method therefor is identical with that of the first embodiment except for some steps. Further, the vibration mode in the present embodiment is of cos 2θ as in the first embodiment. Accordingly, the description duplicating with that of the first embodiment may not be repeatedly provided. In FIG. 7 also, the feedback control circuits 61 and 62 of FIG. 1 are not illustrated expediently for the purpose of simplification in appearance of the figure.

As shown in FIGS. 7 and 8, the ring-shaped vibrating gyroscope 300 according to the present embodiment includes detection electrodes 313b, 313b in place of the detection electrodes 13b, 13b of the first embodiment, as well as suppression electrodes 313d, 313d in place of the suppression electrodes 13d, 13d of the first embodiment. In the present embodiment, the outer end of the upper-layer metallic film 50 at each of the locations of the detection electrodes 313b, 313b and the suppression electrodes 313d, 313d is formed inside by approximately 1 μm with respect to the inner peripheral edge of the ring-shaped vibrating body 11, so as to be approximately 18 μm wide. The upper-layer metallic film 50 at each of the locations of the electrodes is formed inside the center line on the upper surface of the ring-shaped vibrating body 11.

When an angular velocity about the perpendicular axis (in the direction perpendicular to the drawing sheet) of the ring-shaped vibrating gyroscope 300 is applied to the ring-shaped vibrating gyroscope 300, of which a primary vibration similar to that of the first embodiment is excited, a secondary vibration thereof is detected by the two detection electrodes 313b, 313b. The ring-shaped vibrating gyroscope 300 according to the present embodiment also includes the feedback control circuits (not shown) which instruct or control to apply a specific voltage to each of the suppression electrodes 313d, 313d, so as to reduce or cancel the voltage signals related to the secondary vibration detected by the detection electrodes 313b, 313b. It is noted that this specific voltage is used as a resultant output of the vibrating gyroscope.

There are provided the suppression electrodes 313d, 313d that suppress the secondary vibration in accordance with the voltage signals outputted from the detection electrodes 313b, 313b. Therefore, the ring-shaped vibrating gyroscope 300 can exert performance as a vibrating gyroscope remarkably excellent in responsiveness and detectability with almost no secondary vibration being caused to the ring-shaped vibrating body 11.

In the present embodiment, formed on the leg portions 15, ..., 15 are the upper-layer metallic film 50 which serves as the metal tracks 14, the piezoelectric film 40, and the lower-layer metallic film 30. Assume a case where there is generated a disturbance exciting a vibration in the rocking mode. As shown in FIG. 7 for example, because the detection electrodes 313b, 313b are disposed 180° apart from each other in the circumferential direction, possibly generated expansion/contraction motions of the piezoelectric film 40 at the locations on the leg portions connected to the respective detection electrodes 313b, 313b are reverse to each other. As a result, the respective detection electrodes 313b generate electrical signals of positive/negative polarities inverse to each other. Accordingly, these electrical signals are to be canceled each other. Consequently, the motions of the ring-shaped vibrating gyroscope 200 are substantially not affected by the vibration in the rocking mode.

As described above, the ring-shaped vibrating gyroscope 300 according to the present embodiment includes the two detection electrodes 313b, 313b and the two suppression electrodes 313d, 313d. Improved therefore are detectability for a secondary vibration as well as resistance to an external impact that excites a vibration in the rocking mode.

Fourth Embodiment

Figure 9:
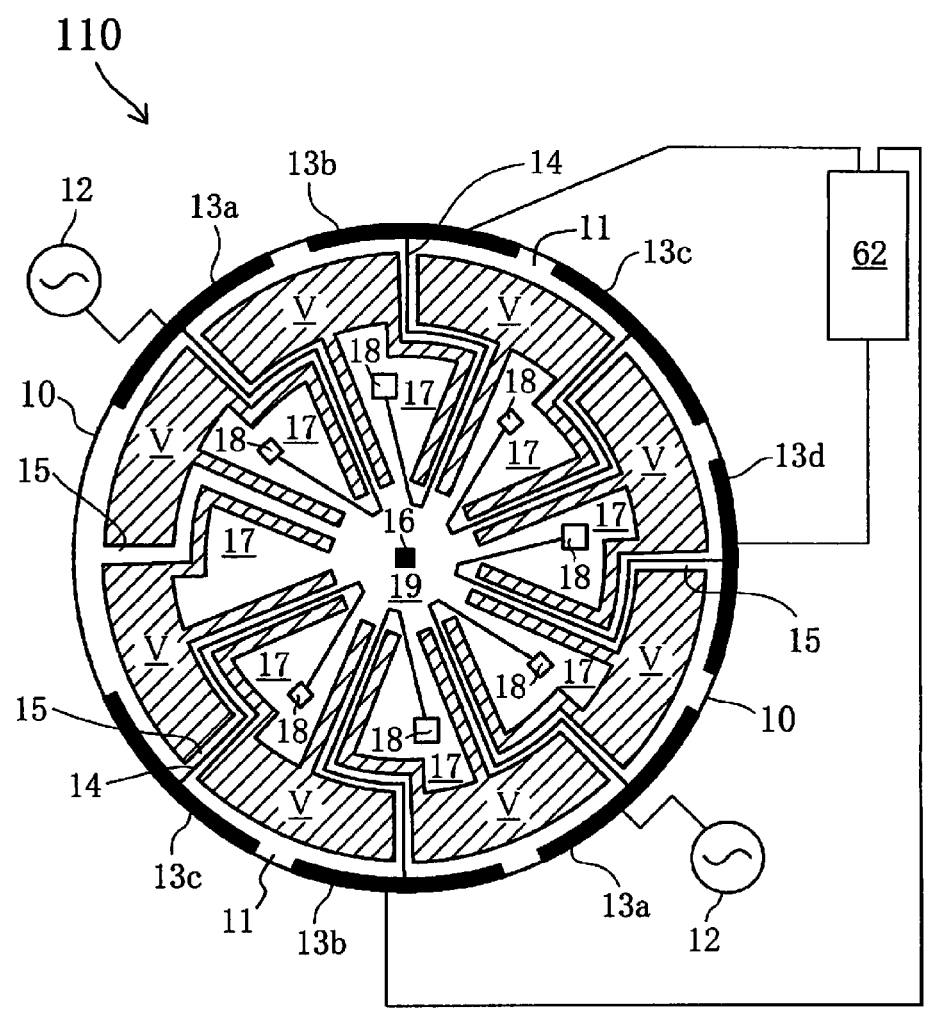
FIG. 9 is a front view of a structure having a principal function in a ring-shaped vibrating gyroscope according to an embodiment of the present invention.

FIG. 9 is a front view of a structure having a principal function in a different ring-shaped vibrating gyroscope 110 according to the present embodiment. This ring-shaped vibrating gyroscope 110 is obtained as a modification by not providing any suppression electrode in the direction of nine o'clock but providing the suppression electrode 13d only in the direction of three o'clock in the ring-shaped vibrating gyroscope 100 shown in FIGS. 1 to 4. Accordingly, there is provided no feedback control circuit 61, so that the feedback control circuit 62 receives outputs from the detection electrode 13b disposed in the direction of six o'clock as well as outputs from the detection electrode 13b disposed in the direction of twelve o'clock. This feedback control circuit 62 is also used for generating a voltage to be applied to the suppression electrode 13d disposed in the direction of three o'clock. This ring-shaped vibrating gyroscope 110 is configured identically with the ring-shaped vibrating gyroscope 100 of the first embodiment, except for the modified arrangements detailed above. The manufacturing method therefor is identical with that of the first embodiment except for some steps. Further, the vibration mode in the present embodiment is of cos 2θ as in the first embodiment. Accordingly, the description duplicating with that of the first embodiment may not be repeatedly provided.

As described above, even in the ring-shaped vibrating gyroscope 110 in which the suppression electrode 13d is provided only in the direction of three o'clock, the secondary vibration can be suppressed by this single suppression electrode 13d.

Further, in the ring-shaped vibrating gyroscope 110 as well as in the ring-shaped vibrating gyroscope 100, even if there is generated a disturbance exciting a vibration in the rocking mode, the motions of the ring-shaped vibrating gyroscope are substantially not affected by this vibration in the rocking mode. As shown in FIG. 9, the detection electrodes 13b, 13b are disposed 180° apart from each other in the circumferential direction. Accordingly, the expansion/contraction motions of the piezoelectric film 40 at the locations on the leg portions connected to the respective detection electrodes 13b, 13b are reverse to each other. The ring-shaped vibrating gyroscope 110 is advantageously simplified in the electrical wiring and the feedback control circuit, in comparison to the ring-shaped vibrating gyroscope 100 that includes the suppression electrodes 13b, 13b in the directions of three o'clock and nine o'clock.

To the contrary, in comparison to the ring-shaped vibrating gyroscope 110, the ring-shaped vibrating gyroscope 100 exerts the superior effects of suppressing the secondary vibration as well as of achieving excellent responsiveness. These superior effects can be obtained because the ring-shaped vibrating gyroscope 100 disclosed in the first embodiment includes the suppression electrodes 13d, 13d for suppressing the secondary vibration, which are disposed in the directions of three o'clock and nine o'clock, unlike the ring-shaped vibrating gyroscope 110. In this configuration, driving forces for suppressing the secondary vibration are to be well symmetrically applied to the ring-shaped vibrating body 11. Unlike the ring-shaped vibrating gyroscope 110, the ring-shaped vibrating gyroscope 100 includes the suppression electrodes 13d, 13d disposed 180° apart from each other, because of the primary vibration in the mode of cos 2θ. In a case where the primary vibration is in the mode of cos Nθ (N is a natural number of 2 or more), a plurality of suppression electrodes 13d, ..., 13d can be disposed (360/N)° apart from each other.

Fifth Embodiment

Figure 10:
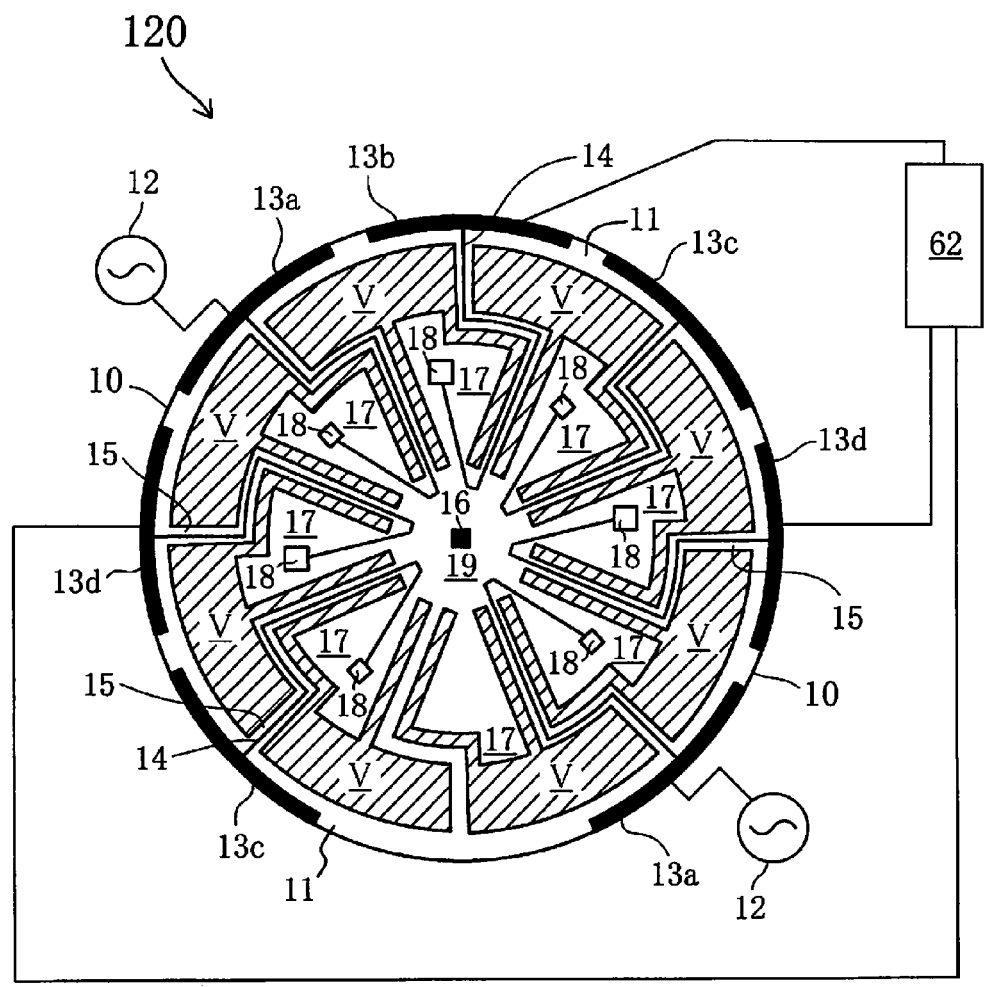
FIG. 10 is a front view of a structure having a principal function in a ring-shaped vibrating gyroscope according to an embodiment of the present invention.

FIG. 10 is a front view of a structure having a principal function in a different ring-shaped vibrating gyroscope 120 according to the present embodiment. This ring-shaped vibrating gyroscope 120 is obtained as a modification by not providing any detection electrode in the direction of six o'clock but providing the detection electrode 13b only in the direction of twelve o'clock in the ring-shaped vibrating gyroscope 100 shown in FIGS. 1 to 4. Accordingly, there is provided no feedback control circuit 61, so that the feedback control circuit 62 receives outputs from the detection electrode 13b disposed in the direction of twelve o'clock. This feedback control circuit 62 is used for generating a voltage to be applied to each of the suppression electrodes 13d that are disposed in the directions of three o'clock and nine o'clock. This ring-shaped vibrating gyroscope 120 is configured identically with the ring-shaped vibrating gyroscope 100 of the first embodiment, except for the modified arrangements detailed above. The manufacturing method therefor is identical with that of the first embodiment except for some steps. Further, the vibration mode in the present embodiment is of cos 2θ as in the first embodiment. Accordingly, the description duplicating with that of the first embodiment may not be repeatedly provided.

As described above, even in the ring-shaped vibrating gyroscope 120 including only the detection electrode 13b disposed in the direction of twelve o'clock, the secondary vibration can be suppressed by the suppression electrodes 13d, 13d.

The ring-shaped vibrating gyroscope 120 is advantageously simplified in the electrical wiring and the feedback control circuit, in comparison to the ring-shaped vibrating gyroscope 100 that includes the detection electrodes 13b, 13b in the directions of twelve o'clock and six o'clock, while the performance of suppressing the secondary vibration being kept substantially equally.

To the contrary, as compared to the ring-shaped vibrating gyroscope 120, the ring-shaped vibrating gyroscope 100 disclosed in the first embodiment exerts the superior effect that the vibration in the rocking mode does not substantially affect the motions of the ring-shaped vibrating gyroscope 100. The detection electrodes 13b, 13b for detecting a secondary vibration are provided in the directions of twelve o'clock and six o'clock. Accordingly, in a case where there is generated a disturbance exciting a vibration in the rocking mode, the expansion/contraction motions of the piezoelectric film 40 at the locations on the leg portions respectively connected to the detection electrodes 13b, 13b are reverse to each other. Unlike the ring-shaped vibrating gyroscope 120, the ring-shaped vibrating gyroscope 100 includes the detection electrodes 13b, 13b disposed 180° apart from each other, because of the primary vibration in the mode of cos 2θ. In a case where the primary vibration is in the mode of cos Nθ (N is a natural number of 2 or more), a plurality of detection electrodes 13b, ..., 13b can be disposed (360/N)° apart from each other.

Sixth Embodiment

Figure 11:
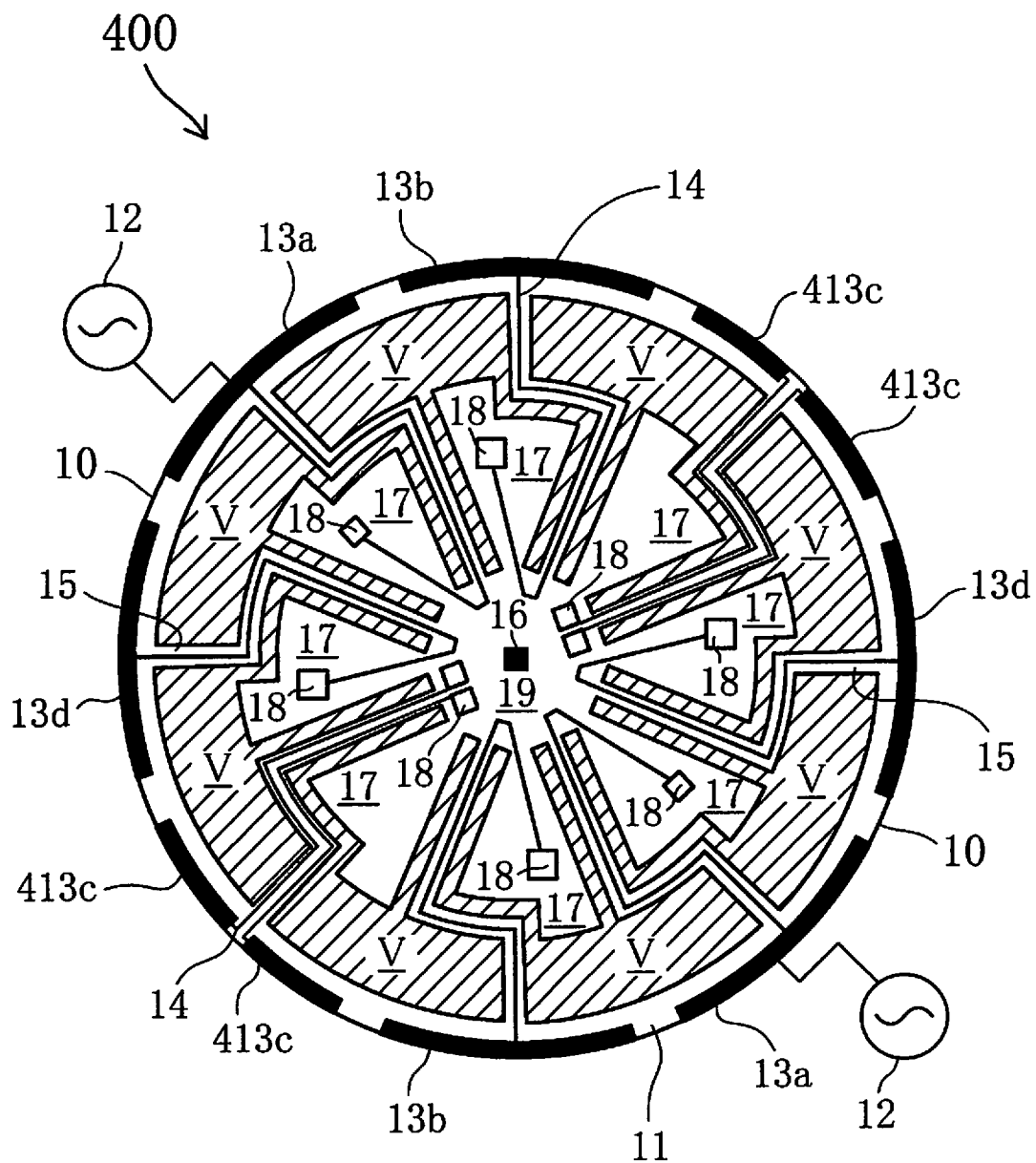
FIG. 11 is a front view of a structure having a principal function in a ring-shaped vibrating gyroscope according to a different embodiment of the present invention.

FIG. 11 is a front view of a structure having a principal function in a different ring-shaped vibrating gyroscope 400 according to the present embodiment. The ring-shaped vibrating gyroscope 400 according to the present embodiment is configured identically with the ring-shaped vibrating gyroscope 100 of the first embodiment, except for the location of the upper-layer metallic film 50 in the first area related to the monitor electrodes in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 11 also, the feedback control circuits 61 and 62 are not illustrated expediently for the purpose of simplification in appearance of the figure.

As shown in FIG. 11, the ring-shaped vibrating gyroscope 400 according to the present embodiment includes four monitor electrodes 413c, ..., 413c, which are connected to the electrode pads 18, ..., 18 by way of the metal tracks, respectively. Similarly to the first embodiment, each of these monitor electrodes 413c, ..., 413c detects the amplitude and the resonant frequency of the primary vibration of the ring-shaped vibrating body 11, and transmits a signal to a known feedback control circuit (not shown). As a result, the ring-shaped vibrating body 11 is vibrated constantly and continuously.

As shown in FIG. 11, the monitor electrodes 413c, ..., 413c are not necessarily required to be disposed (180/2)°, namely, 90°, apart from the driving electrodes 13a, 13a, respectively. The principal effects of the present invention are exerted even with the disposition of the monitor electrodes 413c, ..., 413c shown in FIG. 11. More specifically, adoption of the configuration in the present embodiment enables a vibrating gyroscope utilizing an in-plane vibration to exert driving performance, detectability, and suppressing performance, as well as to remarkably improve the S/N ratio without deteriorating responsiveness. In the present embodiment, the monitor electrodes 413c, . . . , 413c are disposed apart at equal angles (less than 22.5°) from the regions that are 90° apart from the driving electrodes 13a, 13a, respectively. Accordingly reduced is the influence of unevenness in detection sensitivity due to displacement of the monitor electrodes 413c, . . . , 413c, which is caused by variations in the manufacturing steps. Moreover, because outputs in reverse phases by the secondary vibration of the ring-shaped vibrating body 11 suppress each other, it is possible to constantly maintain the magnitude of the primary vibration without being affected by a secondary vibration that is newly generated.

Seventh Embodiment

Figure 12:
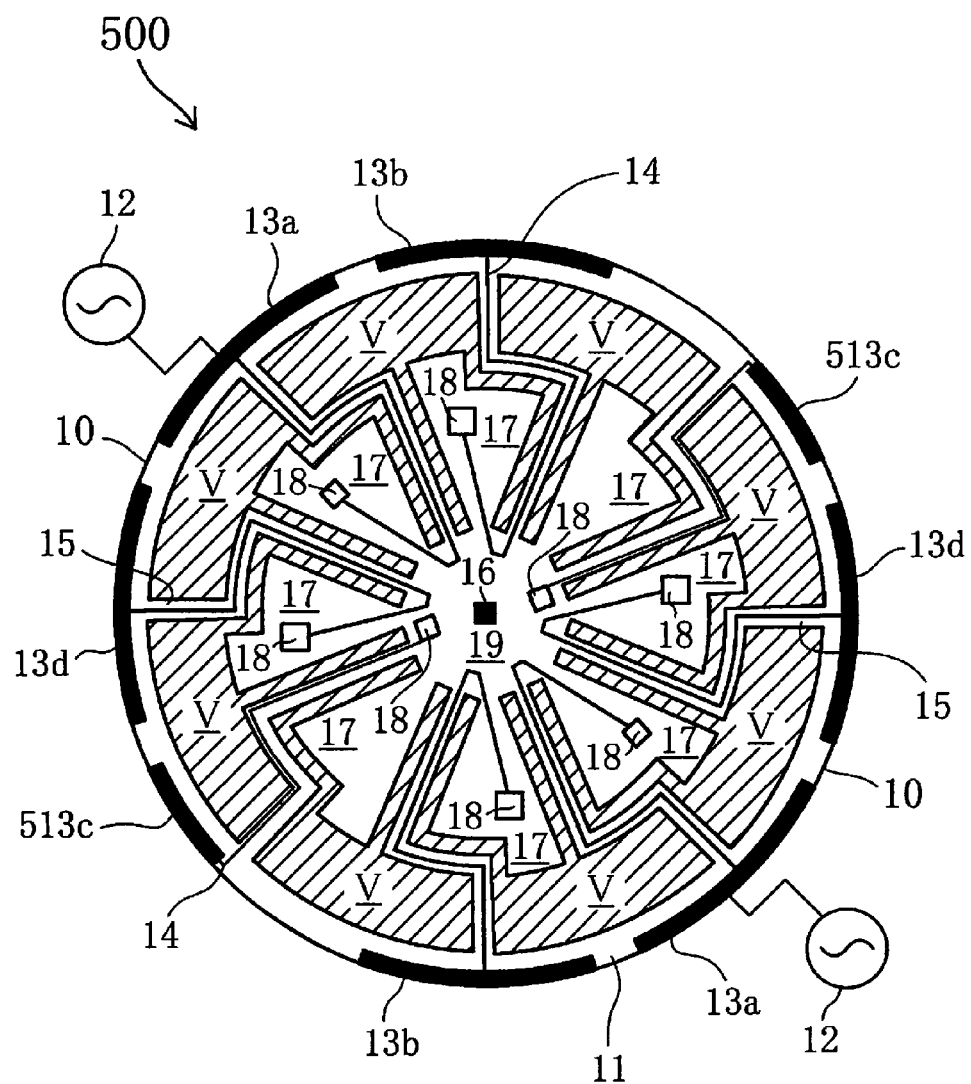
FIG. 12 is a front view of a structure having a principal function in a ring-shaped vibrating gyroscope according to a different embodiment of the present invention.

FIG. 12 is a front view of a structure having a principal function in a different ring-shaped vibrating gyroscope 500 according to the present embodiment. The ring-shaped vibrating gyroscope 500 according to the present embodiment is configured identically with the ring-shaped vibrating gyroscope 100 of the first embodiment, except for the location of the upper-layer metallic film 50 in the first area in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 12 also, the feedback control circuits 61 and 62 are not illustrated expediently for the purpose of simplification in appearance of the figure.

As shown in FIG. 12, the ring-shaped vibrating gyroscope 500 according to the present embodiment includes two monitor electrodes 513c, 513c, which are connected to the electrode pads 18, 18 by way of the metal tracks, respectively. Similarly to the first embodiment, each of these monitor electrodes 513c, 513c detects the amplitude and the resonant frequency of the primary vibration of the ring-shaped vibrating body 11, and transmits a signal to a known feedback control circuit (not shown). As a result, the ring-shaped vibrating body 11 is vibrated constantly and continuously.

As shown in FIG. 12, the monitor electrodes 513c, 513c are not necessarily required to be disposed (180/2)°, namely, 90°, apart from the driving electrodes 13a, 13a, respectively. The principal effects of the present invention are exerted even with the disposition of the monitor electrodes 513c, 513c shown in FIG. 12. More specifically, adoption of the configuration in the present embodiment enables a vibrating gyroscope utilizing an in-plane vibration to exert driving performance, detectability, and suppressing performance, as well as to remarkably improve the S/N ratio without deteriorating responsiveness. In the present embodiment, the monitor electrodes 513c, 513c are disposed apart clockwise at equal angles (less than 22.5°) from the regions that are 90° apart from the driving electrodes 13a, 13a, respectively. Accordingly reduced is the influence of unevenness in detection sensitivity due to displacement of the monitor electrodes 513c, 513c, which is caused by variations in the manufacturing steps. The effects similar to those described above can be exerted even in a case where the monitor electrodes 513c, 513c are disposed apart counterclockwise at equal angles from the regions that are 90° apart from the driving electrodes 13a, 13a, respectively.

Eighth Embodiment

Figure 13:
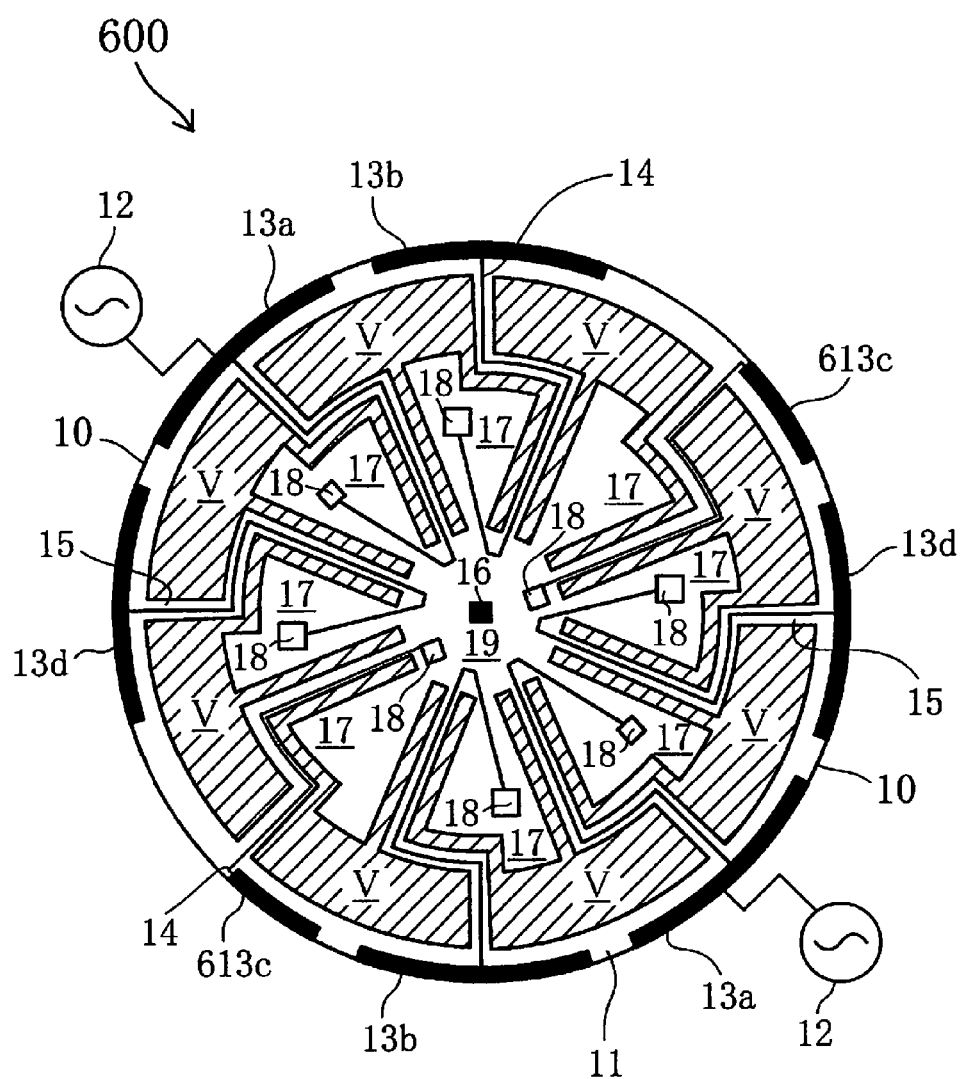
FIG. 13 is a front view of a structure having a principal function in a ring-shaped vibrating gyroscope according to a different embodiment of the present invention.

FIG. 13 is a front view of a structure having a principal function in a different ring-shaped vibrating gyroscope 600 according to the present embodiment. The ring-shaped vibrating gyroscope 600 according to the present embodiment is configured identically with the ring-shaped vibrating gyroscope 100 of the first embodiment, except for the location of the upper-layer metallic film 50 in the first area in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 13 also, the feedback control circuits 61 and 62 are not illustrated expediently for the purpose of simplification in appearance of the figure.

As shown in FIG. 13, the ring-shaped vibrating gyroscope 600 according to the present embodiment includes two monitor electrodes 613c, 613c, which are connected to the electrode pads 18, 18 by way of the metal tracks, respectively. Similarly to the first embodiment, each of these monitor electrodes 613c, 613c detects the amplitude and the resonant frequency of the primary vibration of the ring-shaped vibrating body 11, and transmits a signal to a known feedback control circuit (not shown). As a result, the ring-shaped vibrating body 11 is vibrated constantly and continuously.

As shown in FIG. 13, the monitor electrodes 613c, 613c are not necessarily required to be disposed (180/2)°, namely, 90°, apart from the driving electrodes 13a, 13a, respectively. The principal effects of the present invention are exerted even with the disposition of the monitor electrodes 613c, 613c shown in FIG. 13. More specifically, adoption of the configuration in the present embodiment enables a vibrating gyroscope utilizing an in-plane vibration to exert driving performance, detectability, and suppressing performance, as well as to remarkably improve the S/N ratio without deteriorating responsiveness. In the present embodiment, one of the monitor electrodes 613c, 613c is disposed apart counterclockwise, and the other one is disposed apart clockwise, at equal angles (less than 22.5°) from the regions that are 90° apart from the driving electrodes 13a, 13a, respectively. As a result, even in a case where a secondary vibration is generated to the ring-shaped vibrating body 11, outputs in reverse phases by this secondary vibration suppress each other. Therefore, it is possible to constantly maintain the magnitude of the primary vibration without being affected by a secondary vibration that is newly generated.

Ninth Embodiment

Figure 14A:
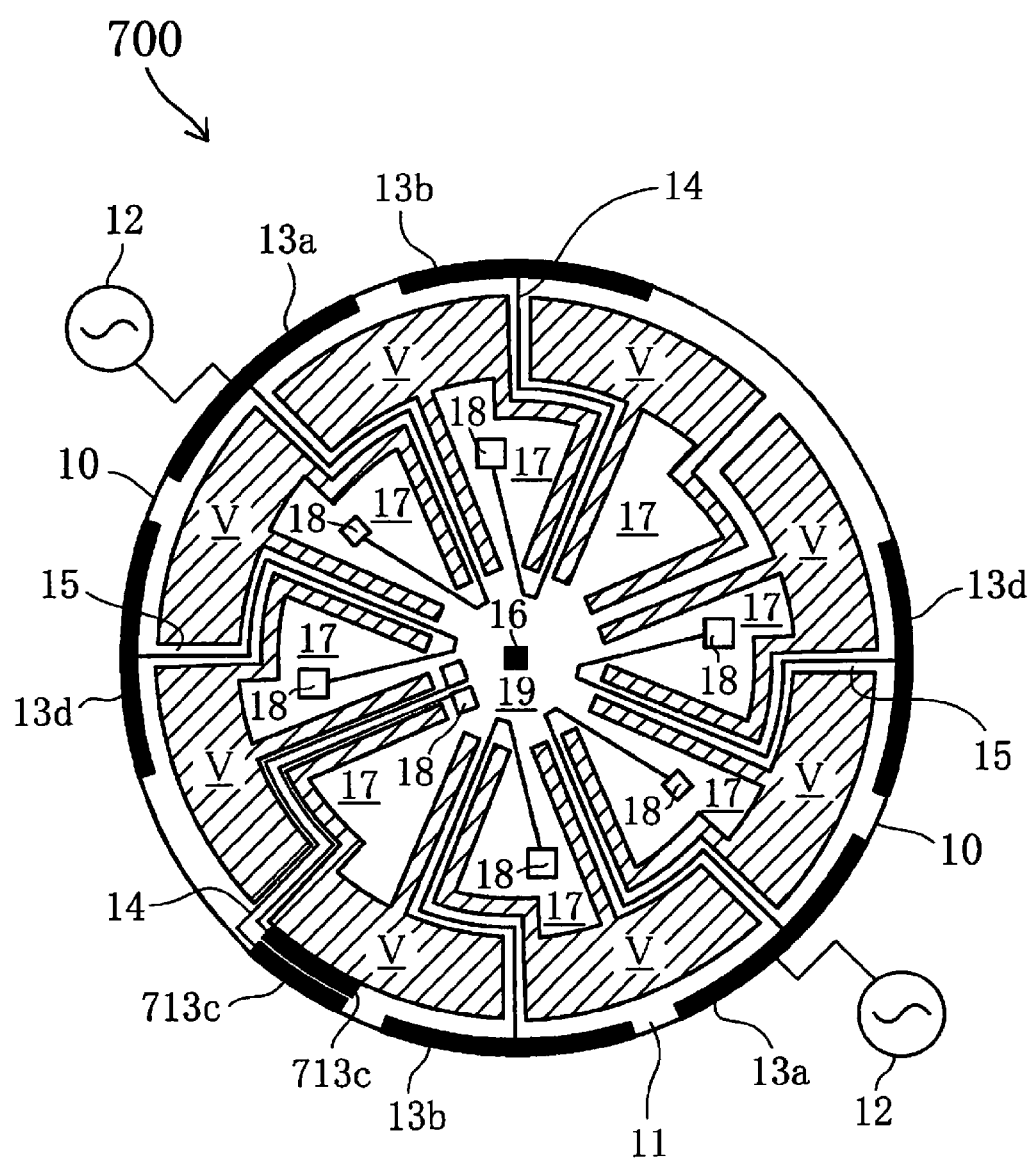
FIG. 14A is a front view of a structure having a principal function in a ring-shaped vibrating gyroscope according to a different embodiment of the present invention.

FIG. 14A is a front view of a structure having a principal function in a different ring-shaped vibrating gyroscope 700 according to the present embodiment. The ring-shaped vibrating gyroscope 700 according to the present embodiment is configured identically with the ring-shaped vibrating gyroscope 100 of the first embodiment, except for the location of the upper-layer metallic film 50 in the first area in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 14A also, the feedback control circuits 61 and 62 are not illustrated expediently for the purpose of simplification in appearance of the figure.

As shown in FIG. 14A, the ring-shaped vibrating gyroscope 700 according to the present embodiment includes two monitor electrodes 513c, 513c, and the monitor electrodes 713c, 713c are connected to the electrode pads 18, 18 by way of the metal tracks, respectively. Similarly to the first embodiment, each of these monitor electrodes 713c, 713c detects the amplitude and the resonant frequency of the primary vibration of the ring-shaped vibrating body 11, and transmits a signal to a known feedback control circuit (not shown). As a result, the ring-shaped vibrating body 11 is vibrated constantly and continuously.

As shown in FIG. 14A, the monitor electrodes 713c, 713c are not necessarily required to be disposed (180/2)°, namely, 90°, apart from the driving electrodes 13a, 13a, respectively. The principal effects of the present invention are exerted even with the disposition of the monitor electrodes 713c, 713c shown in FIG. 14A. More specifically, adoption of the configuration in the present embodiment enables a vibrating gyroscope utilizing an in-plane vibration to exert driving performance, detectability, and suppressing performance, as well as to remarkably improve the S/N ratio without deteriorating responsiveness. In the present embodiment, the monitor electrodes 713c, 713c are disposed apart counterclockwise at equal angles (less than 22.5°) from the regions that are 90° apart from the driving electrodes 13a, 13a, respectively. Accordingly reduced is the influence of unevenness in detection sensitivity due to displacement of the monitor electrodes 413c, . . . , 413c, which is caused by variations in the manufacturing steps. The effects similar to those described above can be exerted even in a case where the monitor electrodes 713c, 713c are disposed apart clockwise at equal angles from the regions that are 90° apart from the driving electrodes 13a, 13a, respectively.

Modification of Ninth Embodiment

Figure 14B:
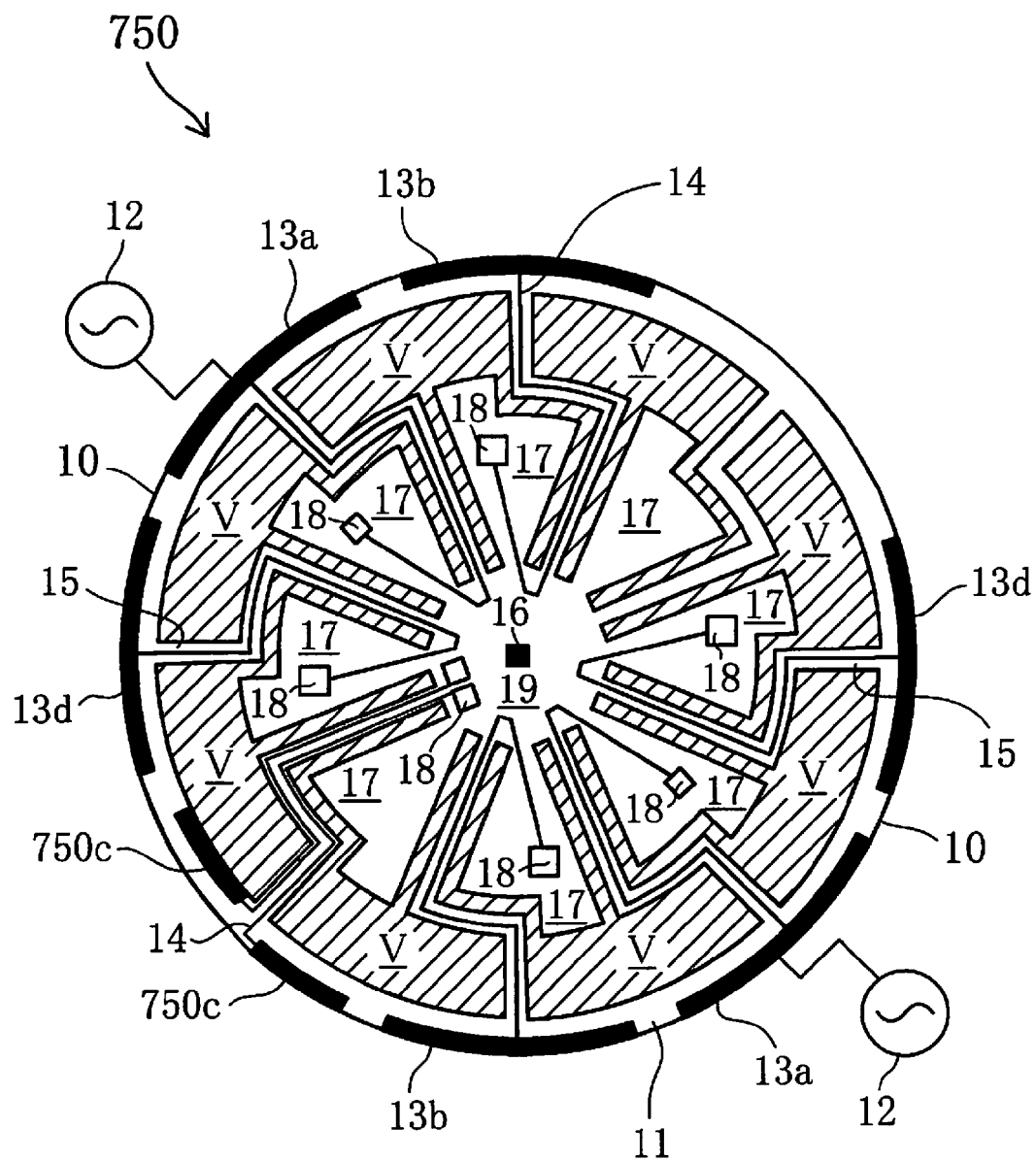
FIG. 14B is a front view of a structure having a principal function in a ring-shaped vibrating gyroscope according to a different embodiment of the present invention.

FIG. 14B is a front view of a structure having a principal function in a different ring-shaped vibrating gyroscope 750 according to the present embodiment. The ring-shaped vibrating gyroscope 750 according to the present embodiment is configured identically with the ring-shaped vibrating gyroscope 100 of the first embodiment, except for the location of the upper-layer metallic film 50 in the first area in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 14B also, the feedback control circuits 61 and 62 are not illustrated expediently for the purpose of simplification in appearance of the figure.

As shown in FIG. 14B, the ring-shaped vibrating gyroscope 750 according to the present embodiment includes two monitor electrodes 753c, 753c, which are connected to the electrode pads 18, 18 by way of the metal tracks, respectively. Similarly to the first embodiment, each of these monitor electrodes 753c, 753c detects the amplitude and the resonant frequency of the primary vibration of the ring-shaped vibrating body 11, and transmits a signal to a known feedback control circuit (not shown). As a result, the ring-shaped vibrating body 11 is vibrated constantly and continuously.

As shown in FIG. 14B, the monitor electrodes 753c, 753c are not necessarily required to be disposed (180/2)°, namely, 90°, apart from the driving electrodes 13a, 13a, respectively. The principal effects of the present invention are exerted even with the disposition of the monitor electrodes 753c, 753c shown in FIG. 14B. In the present embodiment, one of the monitor electrodes 753c, 753c, which is located on the outer periphery of the ring-shaped vibrating body 11, is disposed apart counterclockwise, and the other one, which is located on the inner periphery of the ring-shaped vibrating body 11, is disposed apart clockwise, at equal angles (less than 22.5°) from the regions that are 90° apart from the driving electrodes 13a, 13a, respectively. Accordingly reduced is the influence of unevenness in detection sensitivity due to displacement of the monitor electrodes 413c, . . . , 413c, which is caused by variations in the manufacturing steps.

As disclosed in the seventh to ninth embodiments as well as in the modification of the ninth embodiment, the monitor electrodes are not necessarily required to be disposed (180/2)°, namely, 90°, apart from the driving electrodes 13a, 13a, respectively. There are exerted the principal effects of the present invention under the following conditions. That is, in the vibration mode of cos Nθ, the monitor electrodes are each disposed in a region apart at an angle more than $\{(180/N)-(45/N)\}°$ and less than $\{(180/N)+(45/N)\}°$ from corresponding one of the driving electrodes, and the monitor electrodes are disposed in the region from the outer peripheral edge of the ring-shaped vibrating body 11 to the vicinity of the outer peripheral edge and/or in the region from the inner peripheral edge thereof to the vicinity of the inner peripheral edge. Moreover, in a limited planar region of a ring-shaped vibrating body particularly reduced in size, the monitor electrodes disposed in the regions detailed above most facilitate disposition of the electrodes in other groups and/or disposition of the metal tracks.

Tenth Embodiment

Figure 15:
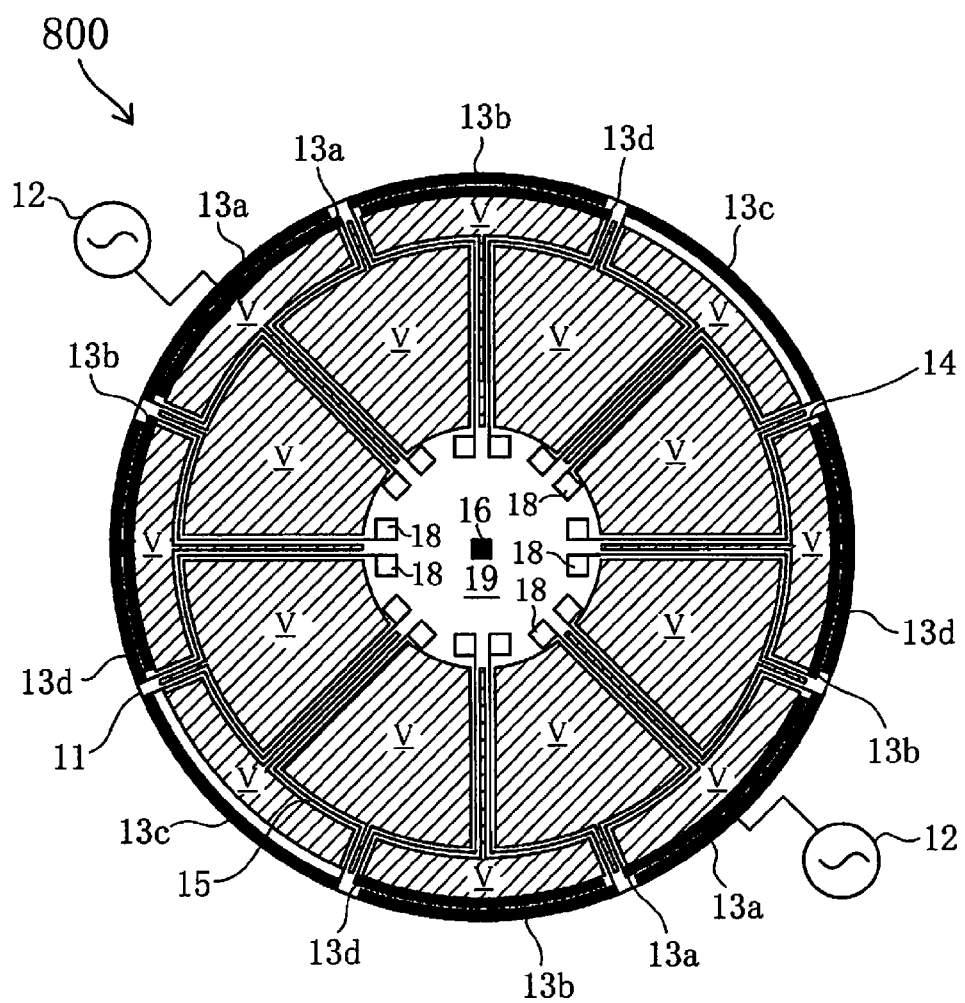
FIG. 15 is a front view of a structure having a principal function in a ring-shaped vibrating gyroscope according to a different embodiment of the present invention.

FIG. 15 is a front view of a structure having a principal function in a different ring-shaped vibrating gyroscope 800 according to the present embodiment. The ring-shaped vibrating gyroscope 800 according to the present embodiment is configured identically with the ring-shaped vibrating gyroscope 100 of the first embodiment, except for the location of the leg portions 15, . . . , 15 and the location of the upper-layer metallic film 50 in the first area in the first embodiment. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 15 also, the feedback control circuits 61 and 62 are not illustrated expediently for the purpose of simplification in appearance of the figure.

As shown in FIG. 15, in the ring-shaped vibrating gyroscope 800 according to the present embodiment, the driving electrodes 13a, . . . , 13a (some of the alternating-current power supplies 12 are not illustrated), the detection electrodes 13b, 13b, and the suppression electrodes 13d, . . . , 13d are disposed respectively in the region from the outer peripheral edge of the ring-shaped vibrating body 11 to the vicinity of the outer peripheral edge and in the region from the inner peripheral edge thereof to the vicinity of the inner peripheral edge. Further, the monitor electrodes 13c, 13c are disposed respectively in the region from the outer peripheral edge of the ring-shaped vibrating body 11 to the vicinity of the outer peripheral edge.

In the present embodiment, a primary vibration of the ring-shaped vibrating gyroscope 800 is excited in a vibration mode of cos 2θ. Thus, the plurality of electrodes 13a to 13d are categorized into groups (a) to (d) detailed below:

(a) two driving electrodes 13a, 13a that are disposed 180° apart from each other in the circumferential direction in the region from the outer peripheral edge of the ring-shaped vibrating body 11 to the vicinity of the outer peripheral edge, and two driving electrodes 13a, 13a that are disposed 180° apart from each other in the circumferential direction in the region from the inner peripheral edge of the ring-shaped vibrating body 11 to the vicinity of the inner peripheral edge;

(b) two monitor electrodes 13c, 13c that are disposed 90° apart from the driving electrodes 13a, 13a respectively in the circumferential direction;

(c) detection electrodes 13b, 13b for detecting a secondary vibration generated upon application of an angular velocity to the ring-shaped vibrating gyroscope 800; and (d) suppression electrodes 13d, . . . , 13d for suppressing the secondary vibration in accordance with voltage signals outputted from the detection electrodes.

In the present embodiment, the detection electrodes 13b, 13b are disposed 45° apart clockwise from the corresponding driving electrodes 13a, . . . , 13a in the circumferential direction in the region from the outer peripheral edge of the ring-shaped vibrating body 11 to the vicinity of the outer peripheral edge, and are disposed 45° apart counterclockwise from the corresponding driving electrodes 13a, . . . , 13a in the circumferential direction in the region from the inner peripheral edge of the ring-shaped vibrating body 11 to the vicinity of the inner peripheral edge. The suppression electrodes 13d, . . . , 13d are disposed 90° apart from the detection electrodes 13b, 13b respectively in the circumferential direction. In other words, the detection electrodes 13b, 13b and the suppression electrodes 13d, . . . , 13d are disposed on a vibration axis of the secondary vibration generated upon application of an angular velocity to the ring-shaped vibrating body 11. This vibration axis of the secondary vibration is inclined at 45° from the vibration axis of the primary vibration generated by the driving electrode 13a, . . . , 13a.

In the present embodiment, the phase of the drive voltage applied to each of the driving electrodes 13a, . . . , 13a that are disposed in the region from the outer peripheral edge of the ring-shaped vibrating body 11 to the vicinity of the outer peripheral edge is reverse to the phase of the drive voltage applied to each of the driving electrodes 13a, . . . , 13a that are disposed in the region from the inner peripheral edge thereof to the vicinity of the inner peripheral edge. The phase detected by each of the detection electrodes 13b, 13b that are disposed in the region from the outer peripheral edge of the ring-shaped vibrating body 11 to the vicinity of the outer peripheral edge is identical with the phase detected by each of the detection electrodes 13b, 13b that are disposed in the region from the inner peripheral edge thereof to the vicinity of the inner peripheral edge.

There are exerted the effects similar to those of the respective embodiments even in a case of the present embodiment where the electrodes of various types are disposed in the region from the outer peripheral edge of the ring-shaped vibrating body 11 to the vicinity of the outer peripheral edge as well as in the region from the inner peripheral edge thereof to the vicinity of the inner peripheral edge. More specifically, adoption of the configuration in the present embodiment enables a vibrating gyroscope utilizing an in-plane vibration to exert driving performance, detectability, and suppressing performance, as well as to remarkably improve the S/N ratio without deteriorating responsiveness. Particularly in the case where these electrodes of respective types are disposed in the region from the outer peripheral edge of the ring-shaped vibrating body 11 to the vicinity of the outer peripheral edge as well as in the region from the inner peripheral edge thereof to the vicinity of the inner peripheral edge, the driving performance as well as the detectability for a secondary vibration of the ring-shaped vibrating body 11 are enhanced in spite of somewhat complicated disposition of the electrodes of respective types. Therefore, the ring-shaped vibrating gyroscope 800 according to the present embodiment is regarded as one of the preferred aspects.

Furthermore, even in a case where some or all of the monitor electrodes 13c, 13c of the ring-shaped vibrating gyroscope 800 in the present embodiment are disposed as in any one of the sixth to tenth embodiments, there are exerted the effects similar to those of the corresponding one of the fourth to tenth embodiments.

Moreover, in the present embodiment, the detection electrodes 13b, 13b and the suppression electrodes 13d, . . . , 13d are disposed on the vibration axes of the secondary vibration, which are inclined at 45° clockwise and counterclockwise from the vibration axis of the primary vibration. However, the present invention is not to be limited to this case. The effects of the present embodiment are at least partially exerted even in such a case where these electrodes are disposed only on the vibration axis of the secondary vibration, which is inclined at 45° clockwise or counterclockwise from the vibration axis of the primary vibration. However, in view of improvement in detection sensitivity (intensity of the electrical signal) for the secondary vibration, the disposition according to the present embodiment is more preferable in comparison to the case where the electrodes are disposed only on the vibration axis of the secondary vibration, which is inclined at 45° clockwise or counterclockwise from the vibration axis of the primary vibration.

Modification (1) of Tenth Embodiment

Figure 16:
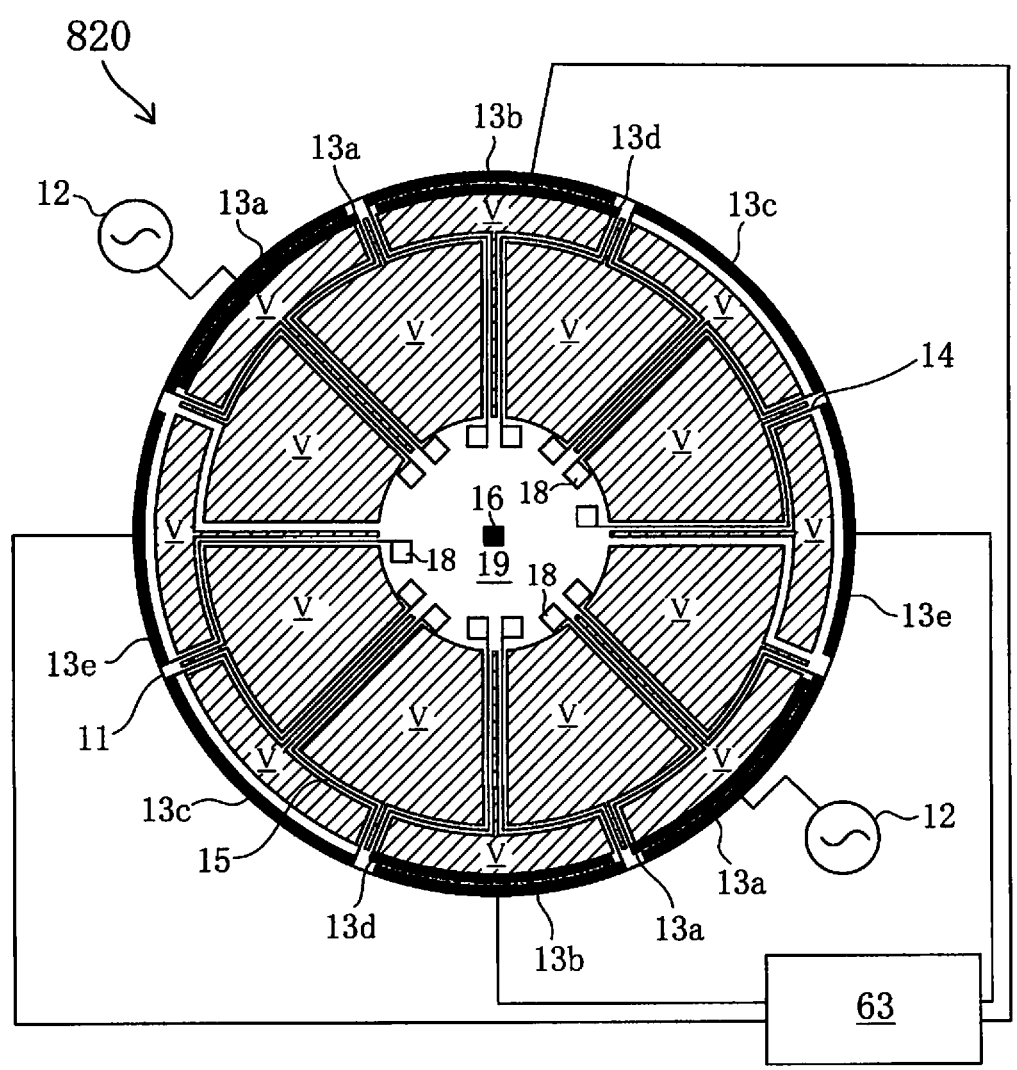
FIG. 16 is a front view of a structure having a principal function in a ring-shaped vibrating gyroscope according to a different embodiment of the present invention.

FIG. 16 is a front view of a structure having a principal function in a different ring-shaped vibrating gyroscope 820 according to the present embodiment. The ring-shaped vibrating gyroscope 820 according to the present embodiment is configured identically with the ring-shaped vibrating gyroscope 800 of the tenth embodiment, except for the locations and functions of some of the electrodes as well as provision of an arithmetic circuit 63 to be connected to some of the electrodes. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 16 also, the feedback control circuits 61 and 62 are not illustrated expediently for the purpose of simplification in appearance of the figure.

As shown in FIG. 16, in the ring-shaped vibrating gyroscope 820 according to the present embodiment, the driving electrodes 13a, . . . , 13a (some of the alternating-current power supplies 12 are not illustrated), and first detection electrodes 13b, 13b are respectively disposed in the region from the outer peripheral edge of the ring-shaped vibrating body 11 to the vicinity of the outer peripheral edge. Further, the monitor electrodes 13*c*, 13*c* are respectively disposed in the region from the outer peripheral edge of the ring-shaped vibrating body 11 to the vicinity of the outer peripheral edge. The suppression electrodes 13*d*, 13*d* are respectively disposed in the region from the inner peripheral edge of the ring-shaped vibrating body 11 to the vicinity of the inner peripheral edge. Further, second detection electrodes 13*e*, 13*e* are respectively disposed in the region from the outer peripheral edge of the ring-shaped vibrating body 11 to the vicinity of the outer peripheral edge. More specifically, the present embodiment is different from the tenth embodiment in that two of the first detection electrodes of the tenth embodiment are not provided as well as in that two of the suppression electrodes 13*d*, . . . , 13*d* are replaced with the second detection electrodes 13*e*, 13*e*, which detect a secondary vibration generated upon application of an angular velocity to the ring-shaped vibrating gyroscope 820. It is noted that the first detection electrodes 13*b* of the present embodiment correspond to the detection electrodes 13*b* of the tenth embodiment.

After the primary vibration is excited by the driving electrodes 13*a*, . . . , 13*a*, upon application of an angular velocity about the perpendicular axis (perpendicular to the drawing sheet) of the disposed ring vibrating gyroscope 820 shown in FIG. 16, in the present embodiment having the vibration mode of cos 2θ, caused by a coriolis force is a secondary vibration having a new vibration axis that is inclined at 45° to either side from the vibration axis of the primary vibration. This secondary vibration is detected by the two first detection electrodes 13*b*, 13*b* as well as by the two second detection electrodes 13*e*, 13*e*. Similarly to the respective embodiments described above, the feedback control circuits (not shown) are provided also in the present embodiment.

Figure 17:
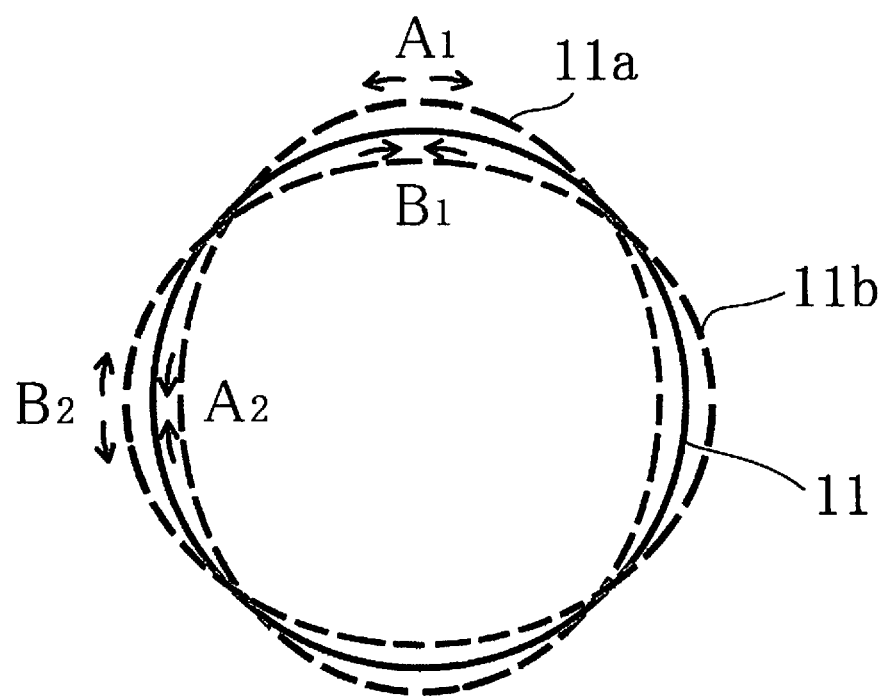
FIG. 17 is a view conceptually illustrating positive/negative polarities of electrical signals of first and second detection electrodes.

In the present embodiment, as shown in FIG. 16, the first detection electrodes 13*b*, 13*b* and the second detection electrodes 13*e*, 13*e* are each disposed correspondingly to the vibration axis of the secondary vibration. In this case, the first detection electrodes 13*b*, 13*b* and the second detection electrodes 13*e*, 13*e* are provided outside the center line on the upper surface of the ring-shaped vibrating body 11. As shown in FIG. 17, when, for example, the ring-shaped vibrating body 11 is transformed into a vibration state shown as a vibrating body 11*a* in a vertically longer elliptical shape, the piezoelectric film 40 at the locations of the first detection electrodes 13*b* disposed outside the center line is expanded in directions indicated by arrows A1, while the piezoelectric film 40 at the locations of the second detection electrodes 13*e* disposed outside the center line is contracted in directions indicated by arrows A2. Accordingly, the electrical signals of these electrodes have positive/negative polarities inverse to each other. Similarly, when the ring-shaped vibrating body 11 is transformed into a vibration state shown as a vibrating body 11*b* in a horizontally longer elliptical shape, the piezoelectric film 40 at the locations of the first detection electrodes 13*b* is contracted in directions indicated by arrows B1, while the piezoelectric film 40 at the locations of the second detection electrodes 13*e* is expanded in directions indicated by arrows B2. Accordingly, also in this case, the electrical signals of these electrodes have positive/negative polarities inverse to each other. The above details described with reference to FIG. 17 hold true for any ring-shaped vibrating gyroscope having a vibration mode of cos 2θ not according to the present embodiment.

In this case, obtained by the arithmetic circuit 63 functioning as a known difference circuit are differences between the electrical signals of the first detection electrodes 13*b*, 13*b* and those of the second detection electrodes 13*e*, 13*e*, which are all provided outside the center line on the upper surface of the ring-shaped vibrating body 11. Resulting detection signals of the secondary vibration have detectability higher than those of the case where only the first detection signals 13*b*, 13*b* are provided.

More specifically, in the present embodiment, formed on the leg portions 15, . . . , 15 are the upper-layer metallic film 50 which serves as the metal tracks 14, the piezoelectric film 40, and the lower-layer metallic film 30. Assume a case where there is generated a disturbance (external impact) exciting a vibration of the ring-shaped vibrating gyroscope 820 in the bounce mode already described. Because the leg portions 15, . . . , 15 are shifted in one direction along the perpendicular axis of the ring-shaped vibrating gyroscope 820, generated are electrical signals in accordance with the expansion/contraction motions of the piezoelectric film 40 at the locations on the respective leg portions 15, . . . , 15. However, in this case, the positive/negative polarities of the above electrical signals are identical with one another at the leg portions that are connected to all the electrodes for detecting a secondary vibration. Thus, when the arithmetic circuit 63 obtains the differences therebetween, the signals at least from the respective leg portions 15 connected to the first detection electrodes 13*b*, 13*b* and the second detection electrodes 13*e*, 13*e*, which are all provided outside the center line on the upper surface of the ring-shaped vibrating body 11, are substantially canceled.

On the other hand, assume a case where there is generated a disturbance exciting a vibration in the rocking mode. For example, as shown in FIG. 16, the first detection electrodes 13*b*, 13*b*, which are provided outside the center line on the upper surface of the ring-shaped vibrating body 11, are disposed 180° apart from each other in the circumferential direction. Accordingly, the expansion/contraction motions of the piezoelectric film 40 at the locations on the leg portions connected to the respective first detection electrodes 13*b*, 13*b* are reverse to each other. As a result, the respective first detection electrodes 13*b* generate electrical signals of positive/negative polarities inverse to each other. Accordingly, these electrical signals are to be canceled each other. The phenomenon described above holds true for the above electrical signals of the leg portions connected to the respective second detection electrodes 13*d*. Consequently, the ring-shaped vibrating gyroscope 820 is substantially not affected by the vibration in the rocking mode.

As described above, the ring-shaped vibrating gyroscope 820 according to the present embodiment includes the four first detection electrodes 13*b*, 13*b* and the two second detection electrodes 13*e*, 13*e*. Improved therefore are detectability for a secondary vibration as well as resistance to an external impact that excites a vibration in the bounce mode or in the rocking mode.

Figure 18:
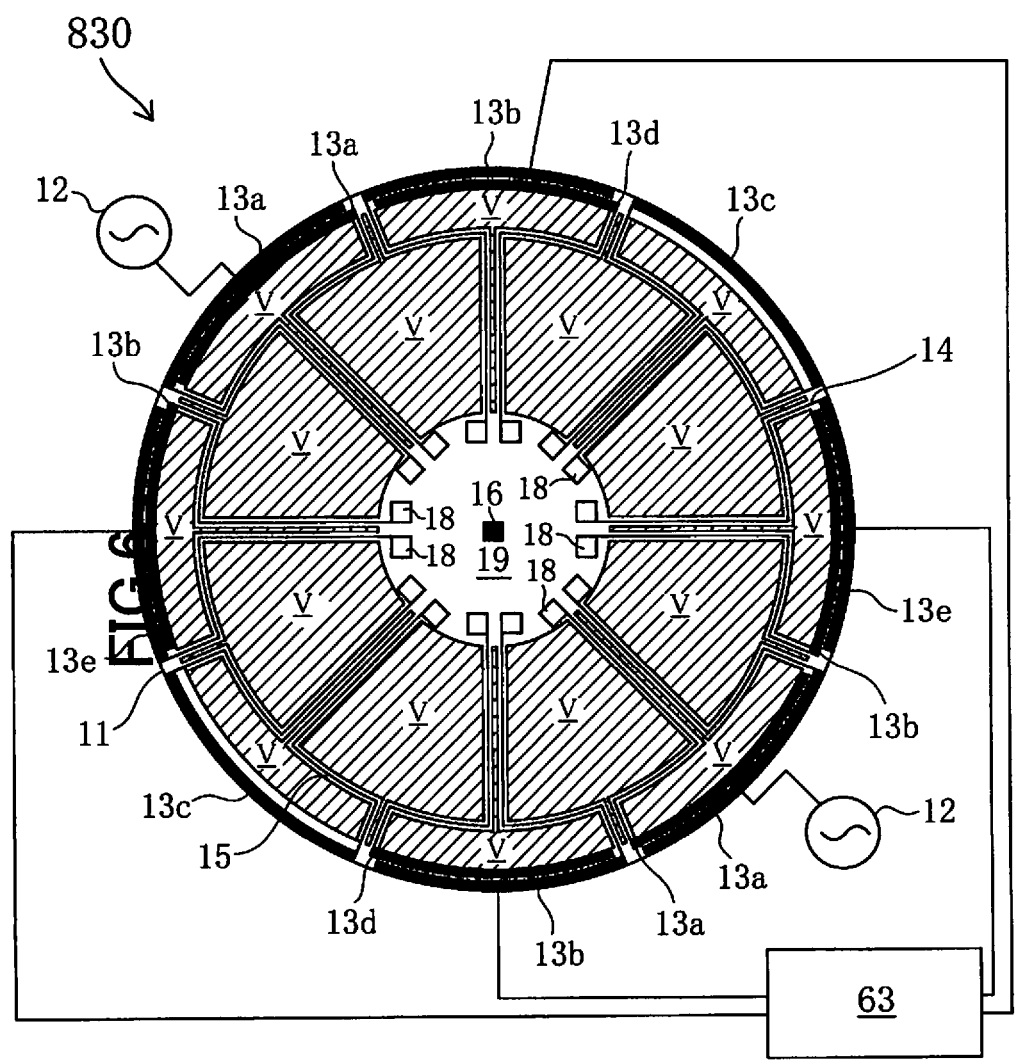
FIG. 18 is a front view of a structure having a principal function in a ring-shaped vibrating gyroscope according to a different embodiment of the present invention.

In the present embodiment, there are provided the four driving electrodes 13*a*, . . . , 13*a*. However, the present invention is not limited to this case. For example, the driving electrodes 13*a* may be disposed only in the region from the outer peripheral edge of the ring-shaped vibrating body 11 to the vicinity of the outer peripheral edge or only in the region from the inner peripheral edge thereof to the vicinity of the inner peripheral edge. Nevertheless, in view of improvement in driving efficiency for the primary vibration and detectability for the secondary vibration, the configuration according to the present embodiment is more preferred. Further, in the present embodiment, there are provided the two first detection electrodes 13*b*, 13*b*. However, the present invention is not limited to this case. For example, as shown in FIG. 18, there may be provided four first detection electrodes 13b, 13b. In this case, however, the number of the first detection electrodes 13b, 13b is not equal to the number of the second detection electrodes 13e, 13e. Accordingly, in a case where there is caused a disturbance (external impact) exciting a vibration particularly in the bounce mode, the effect of cancellation is not sufficiently exerted by the above difference circuit. Therefore, it is more preferable to apply an embodiment in which, similarly to the present embodiment, the number of the first detection electrodes 13b is equal to the number of the second detection electrodes 13e.

Modification (2) of Tenth Embodiment

Figure 19:
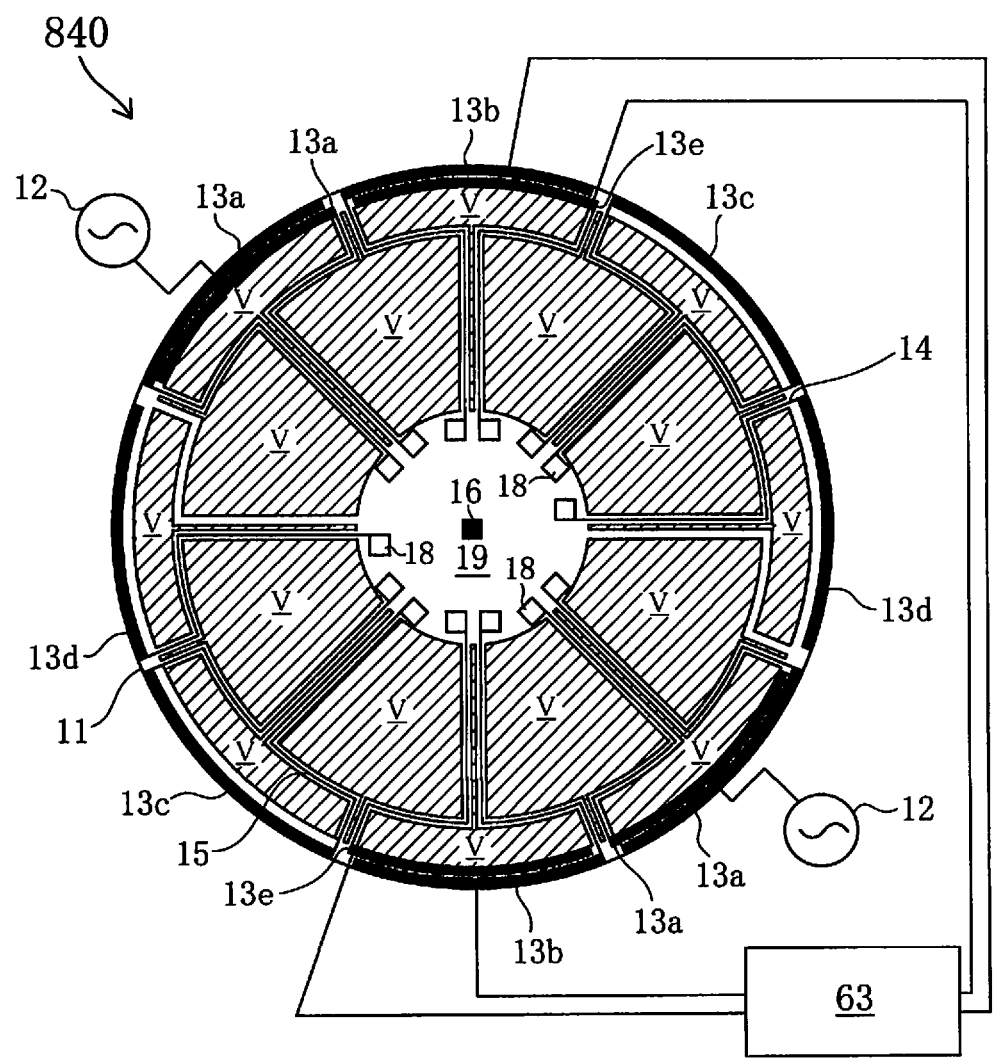
FIG. 19 is a front view of a structure having a principal function in a ring-shaped vibrating gyroscope according to a different embodiment of the present invention.

FIG. 19 is a front view of a structure having a principal function in a different ring-shaped vibrating gyroscope 840 according to the present embodiment. The ring-shaped vibrating gyroscope 840 according to the present embodiment is configured identically with the ring-shaped vibrating gyroscope 800 of the tenth embodiment, except for the locations and functions of some of the electrodes. Further, the manufacturing method therefor is identical with that of the first embodiment except for the pattern formed in accordance with the photolithographic technique. Moreover, the vibration mode in the present embodiment is of cos 2θ as in the first embodiment. Accordingly, the description duplicating with that of the first embodiment may not be repeatedly provided. In FIG. 19 also, the feedback control circuits 61 and 62 are not illustrated expediently for the purpose of simplification in appearance of the figure.

As shown in FIG. 19, in the ring-shaped vibrating gyroscope 840 according to the present embodiment, the driving electrodes 13a, . . . , 13a (some of the alternating-current power supplies 12 are not illustrated), and the first detection electrodes 13b, 13b are respectively disposed in the region from the outer peripheral edge of the ring-shaped vibrating body 11 to the vicinity of the outer peripheral edge and in the region from the inner peripheral edge thereof to the vicinity of the inner peripheral edge. Further, the monitor electrodes 13c, 13c are respectively disposed in the region from the outer peripheral edge of the ring-shaped vibrating body 11 to the vicinity of the outer peripheral edge. The suppression electrodes 13d, 13d are respectively disposed in the region from the outer peripheral edge of the ring-shaped vibrating body 11 to the vicinity of the outer peripheral edge. Further, the second detection electrodes 13e, 13e are respectively disposed in the region from the inner peripheral edge of the ring-shaped vibrating body 11 to the vicinity of the inner peripheral edge. More specifically, the present embodiment is different from modification (1) of the tenth embodiment in that the second detection electrodes 13e in the modification (1) of the tenth embodiment are replaced with the suppression electrodes 13d of the same embodiment. It is noted that the first detection electrodes 13b of the present embodiment correspond to the detection electrodes 13b of the tenth embodiment.

Also in the present embodiment, after the primary vibration is excited by the driving electrodes 13a, . . . , 13a, upon application of an angular velocity about the perpendicular axis (perpendicular to the drawing sheet) of the disposed ring-shaped vibrating gyroscope 840 shown in FIG. 19, in the present embodiment having the vibration mode of cos 2θ, caused by a coriolis force is a secondary vibration having a new vibration axis that is inclined at 45° to either side from the vibration axis of the primary vibration.

This secondary vibration is detected by the two first detection electrodes 13b, 13b as well as by the two second detection electrodes 13e, 13e. Similarly to the respective embodiments described above, the feedback control circuits (not shown) are provided also in the present embodiment. The feedback control circuits output to the suppression electrodes 13d, 13d signals for suppressing the secondary vibration in accordance with signals outputted from the first and second detection electrodes 13b and 13e.

In the present embodiment, as shown in FIG. 19, the first detection electrodes 13b, 13b and the second detection electrodes 13e, 13e are each disposed correspondingly to the vibration axis of the secondary vibration. In this case, the first detection electrodes 13b, 13b are provided outside the center line on the upper surface of the ring-shaped vibrating body 11, and the second detection electrodes 13e, 13e are provided inside the center line on the upper surface of the ring-shaped vibrating body 11.

Obtained by the arithmetic circuit 63 functioning as a known difference circuit are differences between the electrical signals of the first detection electrodes 13b, 13b, which are provided outside the center line on the upper surface of the ring-shaped vibrating body 11, and electrical signals of the second detection electrodes 13e, 13e, which are provided inside the center line on the upper surface of the ring-shaped vibrating body 11. Resulting detection signals of the secondary vibration have detectability higher than those of the case where only the first detection signals 13b, 13b are provided.

In addition, similarly to the modification (1) of the tenth embodiment, in the ring-shaped vibrating gyroscope 840 according to the present embodiment, improved are detectability for a secondary vibration as well as resistance to an external impact that excites a vibration in the bounce mode or in the rocking mode.

Furthermore, similarly to the modification (1) of the tenth embodiment, there are provided the four driving electrodes 13a, . . . , 13a also in the present embodiment. However, the present invention is not limited to this case. Moreover, provided in the present embodiment are the first and second detection electrodes 13b and 13e as well as the two suppression electrodes 13d, 13d. The present invention also includes in the scope thereof a configuration in which only the first detection electrodes 13b or only the second detection electrodes 13e are provided, as well as a configuration in which only one suppression electrode 13d is provided.

Eleventh Embodiment

Figure 20A:
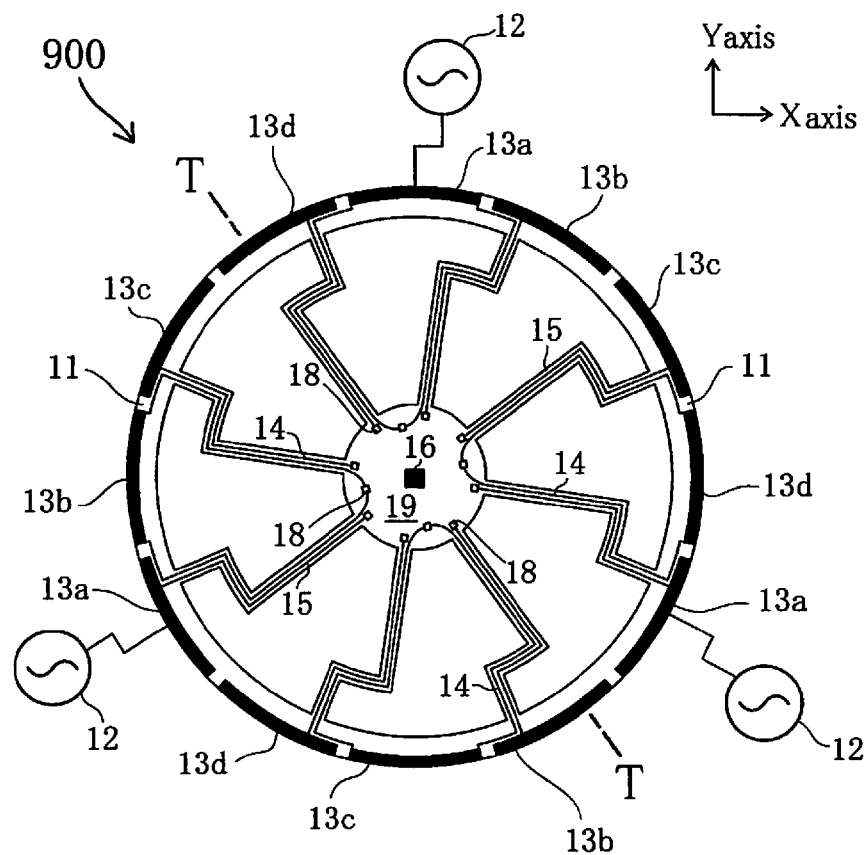
FIG. 20A is a front view of a structure having a principal function in a ring-shaped vibrating gyroscope according to a different embodiment of the present invention.
Figure 20B:
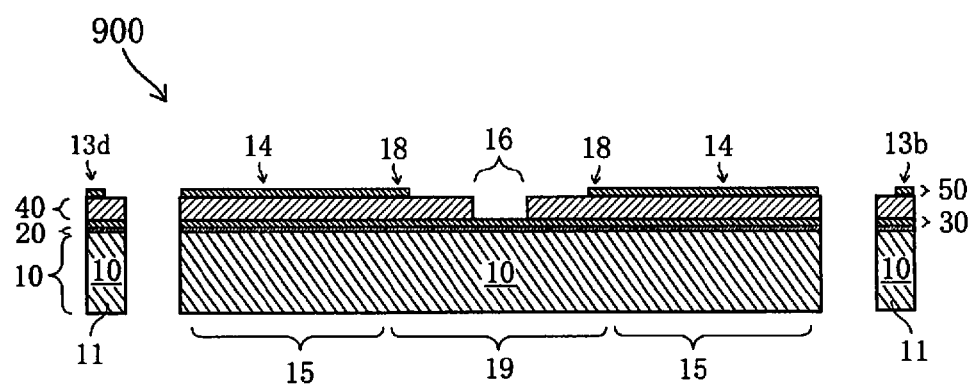
FIG. 20B is a sectional view taken along line T-T of FIG. 20A.

FIG. 20A is a front view of a structure having a principal function in a different ring-shaped vibrating gyroscope 900 according to the present embodiment. FIG. 20B is a sectional view taken along line T-T of FIG. 20A. The ring-shaped vibrating gyroscope 900 according to the present embodiment is configured identically with the ring-shaped vibrating gyroscope 100 of the first embodiment, except for the location of the upper-layer metallic film 50 in the first area as well as the electrode pad fixed ends 17, . . . , 17 in the first embodiment. Further, the manufacturing method therefor is identical with that of the first embodiment except for the pattern formed in accordance with the photolithographic technique. The vibration mode in the present embodiment is of cos 3θ, unlike the first embodiment. Accordingly, the description duplicating with that of the first embodiment may not be repeatedly provided. In FIG. 20A, the feedback control circuits 61 and 62 are not illustrated expediently for the purpose of simplification in appearance of the figure. For the purpose of easier illustration, an X axis and a Y axis are indicated in FIG. 20A. Moreover, in the present embodiment, there are not shown the diagonal lines and the letters V, which appear in the figures according to the other embodiments.

As shown in FIG. 20A, in the ring-shaped vibrating gyroscope 900 according to the present embodiment, respective portions of the upper-layer metallic film 50 are formed outside the center line.

Figure 21A:
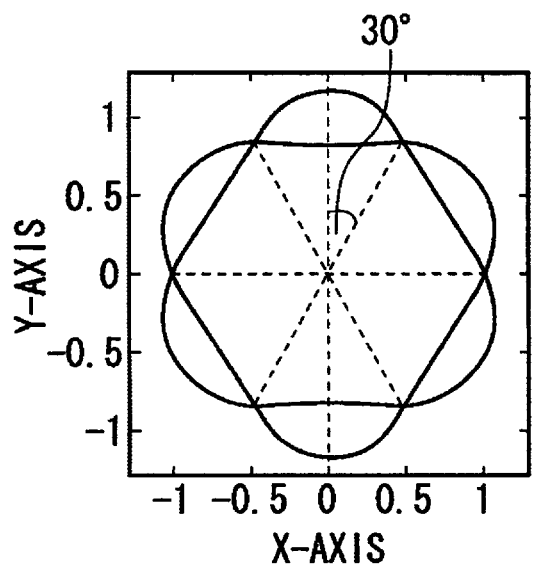
FIG. 21A is a view conceptually illustrating a primary vibration in a vibration mode of cos 3θ in the different embodiment of the present invention.
Figure 21B:
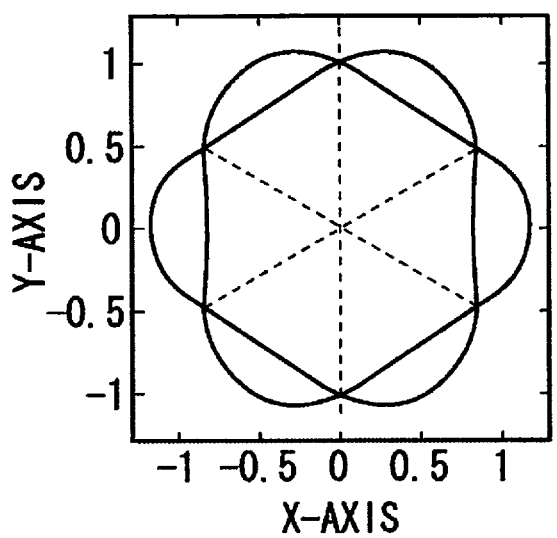
FIG. 21B is a view conceptually illustrating a secondary vibration in a vibration mode of cos 3θ in the different embodiment of the present invention.

The primary vibration in the present embodiment has an in-plane vibration mode of cos 3θ as indicated in FIG. 21A. Further, the secondary vibration in the present embodiment has an in-plane vibration mode of cos 3θ as indicated in FIG. 21B. Thus, the plurality of electrodes 13a to 13e are categorized into groups (a) to (d) detailed below:

(a) three driving electrodes 13a, 13a, 13a disposed 120° apart from each other in the circumferential direction;

(b) in a case where one of the above three driving electrodes 13a, 13a (for example, the driving electrode 13a disposed in the direction of twelve o'clock in FIG. 21A) is designated as a reference electrode, monitor electrodes 13c, 13c, 13c disposed 60°, 180°, and 300° respectively apart clockwise from the reference electrode in the circumferential direction;

(c) detection electrodes 13b, 13b, 13b for detecting a secondary vibration generated upon application of an angular velocity to the ring-shaped vibrating gyroscope 100, these detection electrodes being disposed 30°, 150°, and 270° respectively apart clockwise from the reference electrode in the circumferential direction; and (d) suppression electrodes 13d, 13d, 13d for suppressing the secondary vibration in accordance with voltage signals outputted from the detection electrodes described above, the suppression electrodes being disposed 90°, 210°, and 330° respectively apart clockwise from the reference electrode in the circumferential direction.

As shown in FIG. 20A, in the present embodiment, the metal track 14, 14 are provided such that each of the metal tracks connects both ends of one of the electrodes of each type, in order to eliminate polarization of an electrical signal. The function of the vibrating gyroscope is not affected even in a case where the metal track 14 is provided only from one of the ends of one of the electrodes of each type.

An area in the present embodiment corresponding to the third area includes the post 19 that is formed with the silicon substrate 10 and is connected to the leg portions 15, ..., 15 described above. In the present embodiment, this post 19 functions also as the electrode pad fixed ends 17 in the first embodiment. Further, formed on the upper surface of the post 19 are the silicon oxide film 20, the lower-layer metallic film 30, and the piezoelectric film 40 described earlier, which are provided continuously to the portions of the respective films on the leg portions 15, ..., 15 except for the portion of the fixed potential electrode 16 functioning as a ground electrode. The lower-layer metallic film 30 provided on the silicon oxide film 20 has a potential equal to that of the fixed potential electrode 16. On the upper surface of the piezoelectric film 40 formed above the post 19, there are formed the electrode pads 18, ..., 18 and the metal tracks 14, ..., 14 which are provided continuously to the portions of the metal tracks on the leg portions 15, ..., 15.

Described next are the functions of the respective electrodes included in the ring-shaped vibrating gyroscope 900. As described earlier, excited in the present embodiment is the primary vibration in the in-plane vibration mode of cos 3θ. Because the fixed potential electrode 16 is grounded, the lower-layer metallic film 30, which is provided continuously to the portion on the fixed potential electrode 16, is uniformly set to 0 V.

Firstly, an alternating-current voltage of 1 VP-0 is applied to each of the three driving electrodes 13a, 13a, 13a. As a result, the piezoelectric film 40 is expanded and contracted to excite the primary vibration. In the present embodiment, the upper-layer metallic film 50 is formed outside the center line on the upper surface of the ring-shaped vibrating body 11. Accordingly, it is possible to convert the expansion/contraction motions of the piezoelectric film 40 into the primary vibration of the ring-shaped vibrating body 11 with no upper-layer metallic film 50 being provided on a side surface of the ring-shaped vibrating body 11. Actual alternating-current power supplies 12 each apply to the corresponding driving electrode 13a by way of the corresponding electrode pad 18 that is connected to a conductive wire. However, the alternating-current power supplies 12 are not referred to in the present embodiment and in the other embodiments, for the purpose of easier description.

Then, each of the monitor electrodes 13c, 13c, 13c shown in FIG. 20A detects the amplitude and the resonant frequency of the primary vibration described above, and transmits a signal to a known feedback control circuit (not shown). The feedback control circuit in the present embodiment controls, using the signals outputted from the monitor electrodes 13c, 13c, 13c such that the frequency of the alternating-current voltage applied to each of the driving electrodes 13a, 13a, 13a is equal to the natural frequency of the ring-shaped vibrating body 11, as well as such that the amplitude of the ring-shaped vibrating body 11 has a constant value. As a result, the ring-shaped vibrating body 11 is vibrated constantly and continuously.

In a case where an angular velocity about the perpendicular axis (perpendicular to the drawing sheet, that is, the X-Y plane) of the ring-shaped vibrating gyroscope 900 is applied to the ring-shaped vibrating gyroscope 900, in the present embodiment in the in-plane vibration mode of cos 3θ, caused by a coriolis force is a secondary vibration, as shown in FIG. 20B, having a new vibration axis that is inclined at 30° to either side from the vibration axis of the primary vibration as shown in FIG. 20A.

This secondary vibration is detected by the three detection electrodes 13b, 13b, 13b. In this case, the ring-shaped vibrating gyroscope 900 according to the present embodiment includes feedback control circuits (not shown). These feedback control circuits instruct or control to apply a specific voltage to each of the suppression electrodes 13d, 13d, 13d, so as to cancel the voltage signals related to the secondary vibration detected by these detection electrodes 13b, 13b, 13b, in other words, in order to set the values of these voltage signals to zero. It is noted that this specific voltage is used as a resultant output of the vibrating gyroscope.

As described earlier, there are provided the suppression electrodes 13d, 13d, 13d that suppress the secondary vibration in accordance with the voltage signals outputted from the detection electrodes 13b, 13b, 13b. Accordingly, the ring-shaped vibrating gyroscope 900 can exert performance as a vibrating gyroscope with almost no secondary vibration being caused to the ring-shaped vibrating body 11. It is noted that the ring-shaped vibrating gyroscope 900 according to the present embodiment is significantly excellent in noise performance in comparison to a vibrating gyroscope that does not include the suppression electrodes 13d, 13d, 13d and the feedback control circuits. More specifically, the ring-shaped vibrating gyroscope 900 according to the present embodiment has a volume of noise, particularly in the low frequency region, which is only a half or less of that of an exemplary vibrating gyroscope (the vibrating gyroscope according to the eleventh embodiment) disclosed in PCT/JP2008/071372, which was previously proposed by the applicant of the present invention. Accordingly, the S/N ratio can be remarkably improved without deteriorating responsiveness.

As described above, the ring-shaped vibrating gyroscope 900 according to the present embodiment includes the detection electrodes 13b, 13b, 13b and the suppression electrodes 13d, 13d, 13d. Therefore improved even in the vibration mode of cos 3θ are detectability for a secondary vibration as well as resistance to an external impact that excites a vibration in the rocking mode.

Furthermore, even in a case where some or all of the monitor electrodes 13c, 13c, 13c of the ring-shaped vibrating gyroscope 900 in the present embodiment are disposed as in any one of the sixth to tenth embodiments, there are exerted the effects similar to those of corresponding one of the sixth to tenth embodiments.

In the embodiments other than the second embodiment described above, the piezoelectric film 40 is not etched but the upper-layer metallic film 50 is patterned to form the respective electrodes. However, the present invention is not limited to this case. Also in any one of the embodiments other than the second embodiment, the piezoelectric film 40 may be etched in correspondence with the region substantially provided with the upper-layer metallic film 50, as in the second embodiment. This arrangement prevents undesired expansion and contraction motions of the piezoelectric film 40 as well as transmission of an electrical signal There have been disclosed the modification (1) and the modification (2) of the tenth embodiment. However, these modifications are not limitedly applicable to the tenth embodiment. Even in any one of the embodiments other than the tenth embodiment, if there are provided the first detection electrodes 13a, the second detection electrodes 13e, and the arithmetic circuit 63, it is possible to obtain a ring-shaped vibrating gyroscope that is improved in resistance to an external impact exciting a vibration in the bounce mode or in the rocking mode.

In each of the above embodiments, the silicon oxide film is used as an insulative film on the silicon substrate. However, the present invention is not limited to this case. There are exerted the effects substantially similar to those of the present invention even in such a case where a silicon nitride film or a silicon oxide/nitride film is formed in place of the silicon oxide film.

Further, the vibration mode of cos 2θ is adopted in each of the above first to tenth embodiments as well as the modifications of the tenth embodiment. However, the present invention is limited to this case. There are exerted the effects substantially similar to those of the present invention by adopting, when N is a natural number of 2 or more, driving electrodes that excite a primary vibration of the ring-shaped vibrating body in a vibration mode of cos Nθ. For example, the disposition of the respective electrodes in the eleventh embodiment, in which the vibration mode of cos 3θ is adopted, will be regarded by those skilled in the art as adequately disclosing the disposition of the respective electrodes in the vibration mode of cos 3θ in each of the above first to tenth embodiments as well as the modifications of the tenth embodiment. In other words, when N is a natural number of 2 or more, the disposition of the respective electrodes in the vibration mode of cos Nθ should be adequately disclosed by the description in each of the above embodiments.

Figure 22:
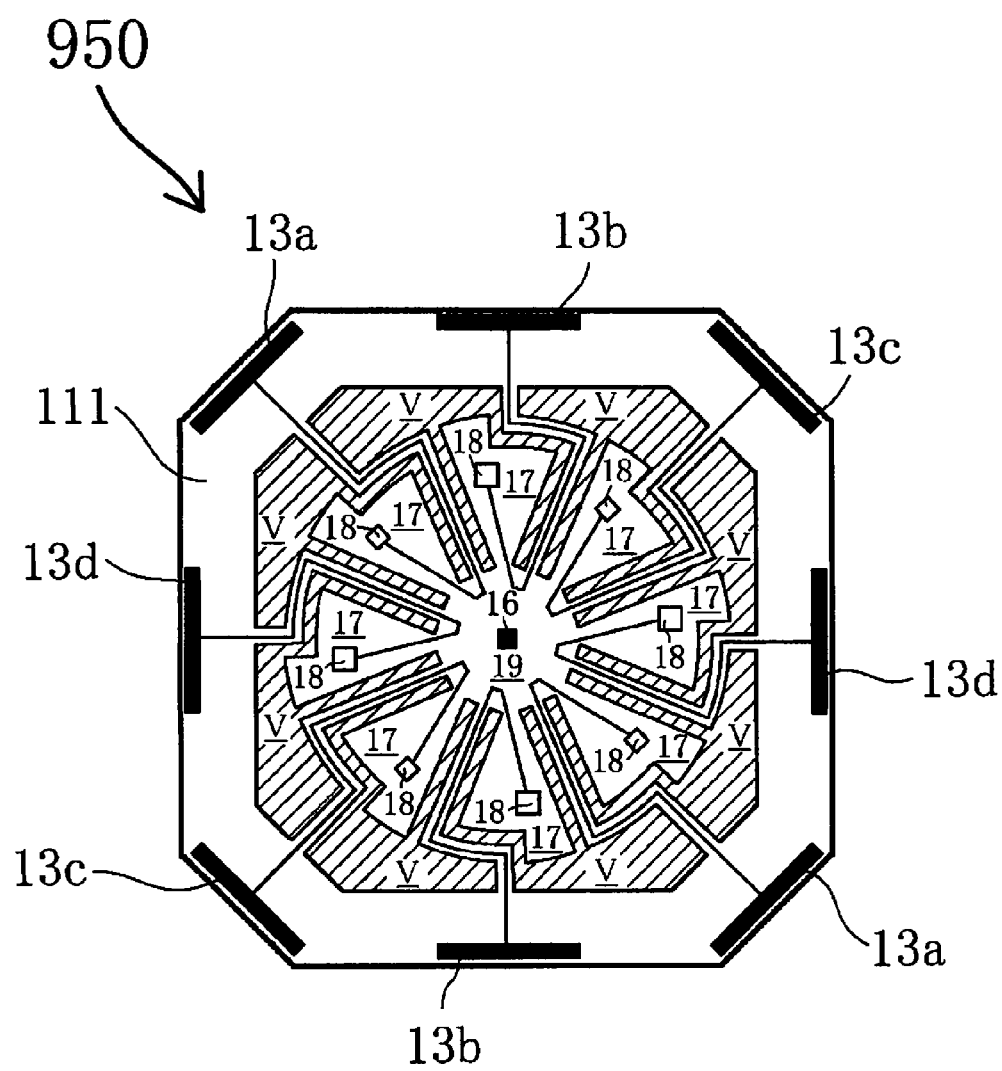
FIG. 22 is a view illustrating a shape of a vibrating body according to a different embodiment of the present invention.

Each of the embodiments described above refers to the vibrating gyroscope including the vibrating body in the ring shape. However, the ring-shaped vibrating body may be replaced with a polygonal vibrating body. There are exerted the effects substantially similar to those of the present invention even with use of a vibrating body in a regular polygonal shape such as a regular hexagonal shape, a regular octagonal shape, a regular dodecagonal shape, or a regular icosagonal shape. Further alternatively, there may be adopted a vibrating body such as an octagonal vibrating body 111 of a ring-shaped vibrating gyroscope 950 shown in FIG. 22. In view of stability of the vibrating body during the vibration motions, it is preferable to adopt a ring-shaped vibrating body that has an outer peripheral edge or an inner peripheral edge in a polygonal shape being symmetrical with respect to an arbitrary point such as the reference point described earlier, or a polygonal shape of n-fold symmetry (n is an arbitrary natural number) in a front view of the vibrating body. It is noted that the "ring shape" is inclusive of an elliptical shape.

Moreover, adopted in each of the embodiments described above is the ring-shaped vibrating gyroscope that is mainly made of silicon. However, the present invention is not limited to such a case. Alternatively, the base material for the vibrating gyroscope may be germanium or silicon germanium, for example. By particularly adopting silicon or silicon germanium among the above examples, it is possible to apply the known anisotropic dry etching technique, which leads to significant contribution to improvement in processing accuracy of the entire gyroscope including the vibrating body.

In each of the embodiments described above, the upper-layer metallic film is patterned to form the respective electrodes. However, the present invention is not limited to this case. There will be exerted the effects similar to those of the present invention even in a case where only the lower-layer metallic film, or both the upper-layer metallic film and the lower-layer metallic film, are patterned to form the respective electrodes. Nevertheless, in view of the facilitation in the manufacturing steps, it is regarded as a preferred aspect to pattern only the upper-layer metallic film as in each of the embodiments described above.

The respective embodiments described above do not include a case where there are provided only one detection electrode and only one suppression electrode. However, the present invention is inclusive of such a configuration as one of the aspects thereof. In other words, the modifications made within the scope of the present invention are also included in the claims of the present invention.

INDUSTRIAL APPLICABILITY

The present invention is applicable, as a vibrating gyroscope, to portions of various types of devices, such as automobiles, aircrafts, and robots.

The invention claimed is:

1. A vibrating gyroscope comprising:
a ring-shaped vibrating body having a uniform plane;
leg portions flexibly supporting the ring-shaped vibrating body; and
a plurality of electrodes disposed on the plane of or above the ring-shaped vibrating body, and formed with at least one of an upper-layer metallic film, at least one of a lower-layer metallic film, and at least one of a piezoelectric film being sandwiched between the upper-layer metallic film and the lower-layer metallic film in a thickness direction thereof; wherein
when N is a natural number of 2 or more, the plurality of electrodes include: a group of driving electrodes for exciting a primary vibration of the ring-shaped vibrating body in a vibration mode of cos Nθ, the driving electrodes being disposed (360/N°) apart from each other in a circumferential direction; a detection electrode for detecting a secondary vibration generated upon application of an angular velocity to the ring-shaped vibrating body, the detection electrode being disposed (90/N°) apart clockwise or counterclockwise from one of the driving electrodes; and a suppression electrode for suppressing the secondary vibration in accordance with a voltage signal outputted from the detection electrode, the suppression electrode being disposed (90/N°) apart clockwise or counterclockwise from one of the driving electrodes or being disposed (180/N°) apart from the detection electrode; and the driving electrodes, the detection electrode, and the suppression electrode are disposed in a region from an outer peripheral edge of the ring-shaped vibrating body to a vicinity of the outer peripheral edge or a region from an inner peripheral edge thereof to a vicinity of the inner peripheral edge, and some of the leg portions are provided thereon with metal tracks that are electrically connected to the driving electrodes, the detection electrode, and the suppression electrode, respectively, wherein a first set of metal tracks are formed above the leg portions and are electrically connected to the corresponding first detection electrodes and are identical in number with second metal tracks that are electrically connected to the corresponding second detection electrodes, and wherein an arithmetic circuit obtains a difference between a signal output from each of the first set of metal tracks connected to the corresponding first detection electrodes and a signal output from each of the second set of metal tracks connected to the corresponding second detection electrodes.

2. The vibrating gyroscope according to claim 1, wherein when the detection electrode is referred to as a first detection electrode, the plurality of electrodes further include a second detection electrode for detecting the secondary vibration, the second detection electrode being disposed (90/N°) apart clockwise or counterclockwise from corresponding one of the driving electrodes or being disposed (180/N°) apart from the first detection electrode.

3. The vibrating gyroscope according to claim 1, wherein the plurality of electrodes include a plurality of suppression electrodes that are disposed (360/N°) apart from each other.

4. The vibrating gyroscope according to claim 1, wherein the plurality of electrodes include a plurality of detection electrodes that are disposed (360/N°) apart from each other.

5. The vibrating gyroscope according to claim 1, wherein the ring-shaped vibrating body is formed with a silicon substrate, and only the upper-layer metallic film, the piezoelectric film, and the lower-layer metallic film are substantially visible in a front view.

6. The vibrating gyroscope according to claim 1, wherein the ring-shaped vibrating body is formed with a silicon substrate, and only the upper-layer metallic film and the lower-layer metallic film are substantially visible in a front view.

7. A vibrating gyroscope comprising:

a ring-shaped vibrating body having a uniform plane;

leg portions flexibly supporting the ring-shaped vibrating body; and a plurality of electrodes disposed on the plane of or above the ring-shaped vibrating body, and formed with at least one of an upper-layer metallic film, at least one of a lower-layer metallic film, and at least one of a piezoelectric film being sandwiched between the upper-layer metallic film and the lower-layer metallic film in a thickness direction thereof; wherein when N is a natural number of 2 or more, the plurality of electrodes include: a group of driving electrodes for exciting a primary vibration of the ring-shaped vibrating body in a vibration mode of cos Nθ, the driving electrodes being disposed (360/N°) apart from each other in a circumferential direction; a group of monitor electrodes each disposed in a region apart at an angle more than $\{(180/N)\text{-}(45/N)\}°$ and less than $\{(180/N)+(45/N)\}°$ from corresponding one of the driving electrodes; a detection electrode for detecting a secondary vibration generated upon application of an angular velocity to the ring-shaped vibrating body, the detection electrode being disposed (90/N°) apart clockwise or counterclockwise from one of the driving electrodes; and a suppression electrode for suppressing the secondary vibration in accordance with a voltage signal outputted from the detection electrode, the suppression electrode being disposed (90/N°) apart clockwise or counterclockwise from one of the driving electrodes or being disposed (180/N°) apart from the detection electrode; and the driving electrodes, the detection electrode, and the suppression electrode are disposed in a region from an outer peripheral edge of the ring-shaped vibrating body to a vicinity of the outer peripheral edge or a region from an inner peripheral edge thereof to a vicinity of the inner peripheral edge, and some of the leg portions are provided thereon with metal tracks that are electrically connected to the driving electrodes, the detection electrode, and the suppression electrode, respectively, wherein a first set of metal tracks are formed above the leg portions and are electrically connected to the corresponding first detection electrodes and are identical in number with second metal tracks that are electrically connected to the corresponding second detection electrodes, and wherein an arithmetic circuit obtains a difference between a signal output from each of the first set of metal tracks connected to the corresponding first detection electrodes and a signal output from each of the second set of metal tracks connected to the corresponding second detection electrodes.

8. The vibrating gyroscope according to claim 7, wherein when the detection electrode is referred to as a first detection electrode, the plurality of electrodes further include a second detection electrode for detecting the secondary vibration, the second detection electrode being disposed (90/N°) apart clockwise or counterclockwise from corresponding one of the driving electrodes or being disposed (180/N°) apart from the first detection electrode.

9. The vibrating gyroscope according to claim 7, wherein the plurality of electrodes include a plurality of suppression electrodes that are disposed (360/N°) apart from each other.

10. The vibrating gyroscope according to claim 7, wherein the plurality of electrodes include a plurality of detection electrodes that are disposed (360/N°) apart from each other.

11. The vibrating gyroscope according to claim 7, wherein the ring-shaped vibrating body is formed with a silicon substrate, and only the upper-layer metallic film, the piezoelectric film, and the lower-layer metallic film are substantially visible in a front view.

12. The vibrating gyroscope according to claim 7, wherein
the ring-shaped vibrating body is formed with a silicon substrate, and
only the upper-layer metallic film and the lower-layer metallic film are substantially visible in a front view.

13. A vibrating gyroscope comprising:
a ring-shaped vibrating body having a uniform plane;
leg portions flexibly supporting the ring-shaped vibrating body; and
a plurality of electrodes disposed on the plane of or above the ring-shaped vibrating body, and formed with at least one of an upper-layer metallic film, at least one of a lower-layer metallic film, and at least one of a piezoelectric film being sandwiched between the upper-layer metallic film and the lower-layer metallic film in a thickness direction thereof; wherein
when N is a natural number of 2 or more, the plurality of electrodes include:
a group of driving electrodes for exciting a primary vibration of the ring-shaped vibrating body in a vibration mode of cos Nθ, the driving electrodes being disposed (360/N°) apart from each other in a circumferential direction;
a detection electrode for detecting a secondary vibration generated upon application of an angular velocity to the ring-shaped vibrating body, the detection electrode being disposed at any angle so as to be along a vibration axis of the secondary vibration, the vibration axis of the secondary vibration being inclined at (90/N°) from a vibration axis of the primary vibration generated by the driving electrodes; and a suppression electrode for suppressing the secondary vibration in accordance with a voltage signal outputted from the detection electrode; and
the driving electrodes, the detection electrode, and the suppression electrode are disposed in a region from an outer peripheral edge of the ring-shaped vibrating body to a vicinity of the outer peripheral edge or a region from an inner peripheral edge thereof to a vicinity of the inner peripheral edge, and some of the leg portions are provided thereon with metal tracks that are electrically connected to the driving electrodes, the detection electrode, and the suppression electrode, respectively,
wherein a first set of metal tracks are formed above the leg portions and are electrically connected to the corresponding first detection electrodes and are identical in number with second metal tracks that are electrically connected to the corresponding second detection electrodes, and
wherein an arithmetic circuit obtains a difference between a signal output from each of the first set of metal tracks connected to the corresponding first detection electrodes and a signal output from each of the second set of metal tracks connected to the corresponding second detection electrodes.

14. The vibrating gyroscope according to claim 13, wherein
the ring-shaped vibrating body is formed with a silicon substrate, and
only the upper-layer metallic film, the piezoelectric film, and the lower-layer metallic film are substantially visible in a front view.

15. The vibrating gyroscope according to claim 13, wherein
the ring-shaped vibrating body is formed with a silicon substrate, and
only the upper-layer metallic film and the lower-layer metallic film are substantially visible in a front view.

* * * * *